(12) United States Patent
Cui et al.

(10) Patent No.: US 11,092,694 B2
(45) Date of Patent: Aug. 17, 2021

(54) METHODS AND SYSTEM FOR CONTROLLING A MOVABLE OBJECT

(71) Applicant: SZ DJI TECHNOLOGY CO., LTD., Shenzhen (CN)

(72) Inventors: Liuzheng Cui, Shenzhen (CN); Di Wu, Shenzhen (CN); Wei Zhang, Shenzhen (CN); Jianyu Song, Shenzhen (CN); Renli Shi, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 103 days.

(21) Appl. No.: 16/415,794

(22) Filed: May 17, 2019

(65) Prior Publication Data

US 2019/0286169 A1 Sep. 19, 2019

Related U.S. Application Data

(63) Continuation of application No. 15/953,117, filed on Apr. 13, 2018, now Pat. No. 10,324,475, which is a
(Continued)

(51) Int. Cl.
*G06G 7/70* (2006.01)
*G01S 19/44* (2010.01)
(Continued)

(52) U.S. Cl.
CPC ............ *G01S 19/44* (2013.01); *B64C 39/024* (2013.01); *G05D 1/0016* (2013.01); *G05D 1/104* (2013.01);
(Continued)

(58) Field of Classification Search
CPC ...... G05D 1/101; G05D 1/104; B64C 39/024; B64C 2201/145; B64C 2201/146; G01S 19/44; G06F 19/00; G06G 7/70
(Continued)

(56) References Cited

U.S. PATENT DOCUMENTS 7,843,431 B2 11/2010 Robbins et al.
9,164,506 B1* 10/2015 Zang .................... G06K 9/0063
(Continued)

FOREIGN PATENT DOCUMENTS

CN 101680943 A 3/2010
CN 102763003 A 10/2012
(Continued)

OTHER PUBLICATIONS

The World Intellectual Property Organization (WIPO) International Search Report and Written Opinion for PCT/CN2017/073093 dated Oct. 27, 2017 8 Pages.

*Primary Examiner* — Shardul D Patel
(74) *Attorney, Agent, or Firm* — Anova Law Group, PLLC

(57) ABSTRACT

A computer-implemented method for controlling a controllable object includes determining a change in a baseline between a controlling object and the controllable object based on measurements from a first location sensor of the controlling object and a second location sensor of the controllable object, mapping the baseline change to a corresponding change in a navigation path of the controllable object based at least in part on a mapping function, generating one or more control commands according to the mapping, and controlling the controllable object to effect the state change according to the one or more control commands.

20 Claims, 13 Drawing Sheets

Related U.S. Application Data continuation of application No. PCT/CN2017/073093, filed on Feb. 8, 2017.

(51) Int. Cl.
  *B64C 39/02* (2006.01)
  *G05D 1/10* (2006.01)
  *G05D 1/00* (2006.01)

(52) U.S. Cl.
  CPC .. *B64C 2201/145* (2013.01); *B64C 2201/146* (2013.01)

(58) Field of Classification Search
  USPC ............. 701/2, 3, 4, 9, 11, 120; 342/29
  See application file for complete search history.

(56) References Cited

U.S. PATENT DOCUMENTS

| | | | |
|---|---|---|---|
| 10,324,475 B2* | 6/2019 | Cui | G05D 1/104 |
| 2009/0118875 A1* | 5/2009 | Stroud | G05D 1/104 |
| | | | 701/3 |
| 2009/0121932 A1 | 5/2009 | Whitehead et al. | |
| 2010/0004802 A1* | 1/2010 | Bodin | G05D 1/0038 |
| | | | 701/11 |
| 2010/0250022 A1 | 9/2010 | Hines et al. | |
| 2014/0008496 A1* | 1/2014 | Ye | B64C 13/20 |
| | | | 244/190 |
| 2014/0226584 A1* | 8/2014 | Cullen | H04B 7/18508 |
| | | | 370/329 |
| 2015/0142213 A1* | 5/2015 | Wang | B64C 39/024 |
| | | | 701/2 |
| 2015/0190925 A1* | 7/2015 | Hoffman | B25J 9/1671 |
| | | | 700/257 |
| 2016/0241767 A1* | 8/2016 | Cho | G06F 3/0346 |
| 2016/0313742 A1* | 10/2016 | Wang | B64C 39/024 |
| 2016/0370807 A1 | 12/2016 | Gilmore et al. | |
| 2017/0010611 A1 | 1/2017 | Tao et al. | |
| 2017/0016011 A1* | 1/2017 | Li | C12N 15/8214 |
| 2017/0300759 A1* | 10/2017 | Beard | G06K 9/6202 |
| 2018/0095478 A1* | 4/2018 | van Cruyningen | G01S 19/14 |

FOREIGN PATENT DOCUMENTS

| | | |
|---|---|---|
| CN | 102957897 A | 3/2013 |
| CN | 103502844 A | 1/2014 |
| CN | 105242685 A | 1/2016 |
| CN | 105283816 A | 1/2016 |
| EP | 1868008 A1 | 12/2007 |
| KR | 20160024562 A | 3/2016 |

\* cited by examiner

METHODS AND SYSTEM FOR CONTROLLING A MOVABLE OBJECT

CROSS-REFERENCE TO RELATED APPLICATIONS

This application is a continuation application of U.S. application Ser. No. 15/953,117, filed on Apr. 13, 2018, which is a continuation application of International Application No. PCT/CN2017/073093, filed on Feb. 8, 2017, the entire contents of both of which are incorporated herein by reference.

BACKGROUND OF THE DISCLOSURE

Modern unmanned aerial vehicles (UAVs) are used to perform a variety of tasks such as navigation, surveillance and tracking, remote sensing, search and rescue, scientific research, and the like. The ability to control the UAVs in a precise fashion (e.g., at a centimeter or sub-centimeter level) is often desirable for achieving such tasks. Existing techniques fail to enable control of the UAVs with a satisfactory level of precision.

SUMMARY OF THE DISCLOSURE

Methods, systems and devices for controlling a movable object are provided. According to embodiments, a computer-implemented method for controlling a controllable object is provided. The method comprises determining a change in a baseline between a controlling object and the controllable object based on measurements from a first location sensor of the controlling object and a second location sensor of the controllable object, mapping the baseline change to a corresponding state change for the controllable object based at least in part on a mapping function, and generating one or more control commands to effect the state change for the controllable object.

In some embodiments, the controllable object is an unmanned aerial vehicle (UAV).

In some embodiments, the controlling object is a UAV.

In some embodiments, the first location sensor and the second location sensor are satnav receivers.

In some embodiments, determining the baseline change comprises determining a baseline between the controlling object and the controllable object with centimeter level or sub-centimeter level accuracy.

In some embodiments, wherein determining the baseline change comprises obtaining double-differenced measurements based on the measurements from the first location sensor and the second location sensor; and fixing carrier phase ambiguities based on the double differenced measurements.

In some embodiments, the state change for the controllable object is a change in position and the control commands are position control commands. In some embodiments, the state change for the controllable object comprises an activation or a deactivation of a predefined routine of the controllable object. In some embodiments, the state change for the controllable object comprises changing an operation of a component or a payload of the controllable object.

In some embodiments, the method further comprises determining an updated baseline between the controllable object and the controlling object after generating the one or more control commands; and generating one or more additional control commands to effect the state change for the controllable object based on the updated baseline.

According to embodiments, a remote control terminal is provided. The remote control terminal comprises a satnav receiver configured to receive satellite signals from one or more satellites; a memory that stores one or more computer-executable instructions; and one or more processors configured to access the memory and execute the computer-executable instructions to perform a method comprising determining a change in a baseline between the remote control terminal and a controllable object based at least in part on measurements from the satnav receiver, mapping the baseline change to a corresponding state change for the controllable object based at least in part on a mapping function, and generating one or more control commands to effect the state change for the controllable object.

In some embodiments, the controlling object is an unmanned aerial vehicle (UAV).

In some embodiments, determining the baseline change comprises receiving additional measurements from the controllable object, and fixing carrier phase ambiguities based on the measurements from the satnav receiver and the additional measurements from the controllable object.

In some embodiments, the state change for the controllable object is a change in position and the control commands are position control commands. In some embodiments, the state change for the controllable object is a change in velocity and the control commands are velocity control commands. In some embodiments, the state change for the controllable object comprises changing an operation of a component or a payload of the controllable object. In some embodiments, the state change for the controllable object comprises a change in an attribute of a navigation path of the controllable object.

In some embodiments, the method further comprises determining an updated baseline between the remote control terminal and the controllable object after generating the one or more control commands; and generating one or more additional control commands to effect the state change for the controllable object based on the updated baseline.

According to embodiments, an unmanned aerial vehicle (UAV) is provided. The UAV comprises a satnav receiver configured to receive satellite signals from one or more satellites; a memory that stores one or more computer-executable instructions; and one or more processors configured to access the memory and execute the computer-executable instructions to perform a method comprising determining a change in a baseline between a controlling object and the UAV based at least in part on measurements from the satnav receiver; mapping the baseline change to a corresponding state change for the UAV based at least in part on a mapping function; and generating one or more control commands to effect the state change for the UAV.

In some embodiments, determining the baseline change comprises receiving additional measurements from the controlling object; and fixing carrier phase ambiguities based on the measurements from the satnav receiver and the additional measurements from the controlling object.

In some embodiments, the method further comprises determining an updated baseline between the UAV and the controlling object after execution of the one or more control commands; and generating one or more additional control commands to effect the state change for the UAV based on the updated baseline.

According to embodiments, a control system is provided. The control system comprises a memory that stores one or more computer-executable instructions; and one or more processors configured to access the memory and execute the computer-executable instructions to perform a method comprising determining a change in a baseline between a controlling object and the controllable object based on measurements from a first location sensor of the controlling object and a second location sensor of the controllable object; mapping the baseline change to a corresponding state change for the controllable object based at least in part on a mapping function; and generating one or more control commands to effect the state change for the controllable object.

It shall be understood that different aspects of the disclosure can be appreciated individually, collectively, or in combination with each other. Various aspects of the disclosure described herein may be applied to any of the particular applications set forth below or data communication between any other types of movable and/or stationary objects.

Other objects and features of the present disclosure will become apparent by a review of the specification, claims, and appended figures.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE DISCLOSURE

The capability to provide precise remote control of UAVs is highly desirable, especially given decreasing UAV sizes and more complex deployment environment. For instance, it may be desirable to be able to control of the UAV's movement at a centimeter-level or a sub-centimeter-level, in order to enable maneuvers in a tight space, or to perform spatially-sensitive operations.

Existing remote control methods fail to allow for precise control of UAVs. For example, a traditional remote control terminal equipped with a joystick may be capable of translating mechanical movements of the joystick into corresponding remote control commands for changing an orientation or a velocity of the UAV. A remote control terminal (e.g., smart phones or tablets) equipped with one or more sensors (e.g., gyroscopes, accelerometers) can detect movements (e.g., a change in orientation or acceleration) of the terminal, and translate such movements into corresponding control commands for the UAV. Such methods, however, are typically limited to controlling an orientation or a velocity of a UAV, and fail to provide precise positional control of the UAV.

The systems, devices, and methods are provided for precisely controlling movable objects (e.g., UAVs) that address some or all problems discussed above. In particular, a baseline vector (also referred to as a baseline) between a controlling movable object (e.g., a remote control terminal for a UAV) and a controllable movable object (e.g., a UAV) can be determined with centimeter level or sub-centimeter level (e.g., millimeter level) accuracy. For example, the baseline can be determined using real time kinematic (RTK) or similar techniques based on measurements from location sensors carried by the controlling movable object and/or the controlled movable object. Examples of location sensors include satellite navigation (satnav) system receiver (also referred to as satnav receivers).

A change in the baseline (also referred to as a baseline change, a baseline vector change, or a baseline change vector) can be mapped, using a predetermined mapping function, to a corresponding state change of the controllable object. The baseline change can result from movement of the controlling movable object, the controlled movable object, or both. The corresponding state change of the controllable object can include a position change, a change in velocity and/or acceleration, an orientation change, a navigation path change, an activation or deactivation of a functionality of the controllable object, and the like. Advantageously, precise measurement of the baseline between the controlling and the controlled objects with centimeter or sub-centimeter accuracy allows precise control of the controlled object. These and other embodiments are discussed in light of the figures.

Figure 1:
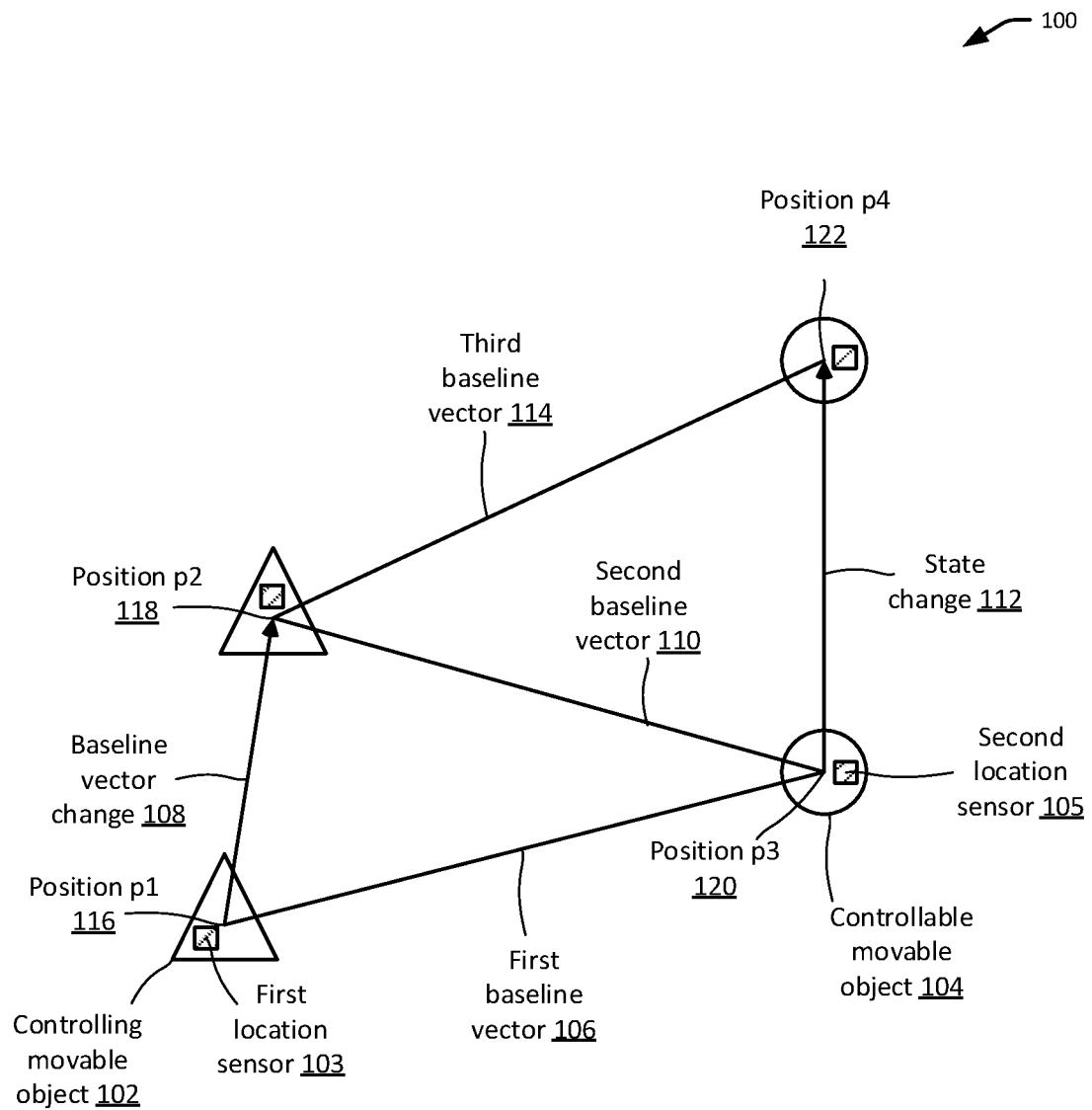
FIG. 1 illustrates an exemplary method for controlling a movable object, in accordance with embodiments.

FIG. 1 illustrates an exemplary method for controlling a movable object, in accordance with embodiments. In particular, a baseline vector change 108 between a controlling movable object 102 (also referred to as a controlling object, controlling device or controlling platform) and a controllable movable object 104 (also referred to as a controllable object) can be mapped to a corresponding state change 112 of the controllable movable object 104.

The controlling movable object 102 can include a remote control terminal, a UAV, or any other suitable movable object described herein that is configured to control another object. A controllable movable object 104 can include a UAV or any other suitable movable object described herein that can be controlled remotely by another object. For example, the controlling movable object 102 may be configured to control the controllable movable object 104. The controllable movable object 104 may or may not be configured to move autonomously.

A baseline vector (also referred to as a baseline) between the controlling movable object 102 and the controllable movable object 104 can be measured. The baseline vector can be from the controlling movable object 102 to the controllable movable object 104, or vice versa. The baseline vector can comprise a plurality of vector components along respective axes (e.g., X, Y, and Z axes) of a suitable coordinate system such as a global or local coordinate system.

The baseline vector can be measured on a periodic basis. In some embodiments, the baseline vector can be measured at a frequency of 0.1 Hz, 0.5 Hz, 1 Hz, 5 Hz, 10 Hz, 20 Hz, 50 Hz, or any other suitable frequency. The frequency at which the baseline vector is measured may be configurable, for example, by a user or by a system administrator. The measurement frequency may be constant or vary from time to time, based on factors such as availability of resources (e.g., CPU, memory, network bandwidth), conditions of operating environment (e.g., signal strength, interference, signal-to-noise ratio (SNR), weather), user commands, and the like.

As illustrated in FIG. 1, a first baseline vector 106 may be measured at or near a first point in time, t1, when the controlling movable object 102 is at position p1 116 and the controllable movable object 104 is at position p3 120. Subsequently, a second baseline vector 110 may be measured at or near a second point in time, t2, when the controlling movable object 102 moves to position p2 118 and the controllable movable object 104 is at position p3 120. Subsequently, a third baseline vector 114 may be measured at or near a third point in time, t3, when the controlling movable object 102 is at position p2 118 and the controllable movable object 104 moves to position p4 122.

The baseline vector can be determined based at least in part on measurements from a first location sensor 103 carried by the controlling movable object 102 and/or measurements from a second location sensor 105 carried by the controllable movable object 104. In general, the position of a movable object is considered the same as the position of a location sensor of the movable object. The location sensors can be configured to obtain information useful for determining locations of the respective location sensors. Examples of location sensors include satnav receivers.

A satnav system uses satellites to provide autonomous geo-spatial positioning. Specifically, a satnav receiver can be configured to receive satellite signals transmitted by one or more satellites, for example, by radio. The satellite signals can be processed (e.g., by circuits of the satnav receiver or a processor operably connected to the satnav receiver) to determine the location (e.g., longitude, latitude, and/or altitude) of the satnav receiver. Satnav systems can provide global or regional coverage. A satnav system with global coverage can be referred to as a global navigation satellite system (GNSS). Examples of a GNSS include NAVSTAR Global Positioning System (GPS) provided by the United States, GLONASS provided by Russia, BeiDou Navigation Satellite System (or Beidou-2) provided by China, and Galileo provided by the European Union. Examples of a satnav system with regional coverage include Beidou-1 provided by China, NAVigation with Indian Constellation (NAVIC) provided by India, and Quazi-Zenith Satellite System (QZSS) provided by Japan.

The satellite signals received by a satnav receiver can include ranging codes and navigation data (also referred to as navigation messages). Ranging codes can include pseudo random noise (PRN) numbers and can be correlated by a satnav receiver to determine a travel time of a satellite signal to the receiver (and hence the distance between the satellite and the receiver). The PRN numbers can include coarse/acquisition (C/A) codes for the general public and restricted precision (P) codes military use. The navigation data can include detailed information about a satellite such as time information, clock bias parameters, the satellite's status and health, satellite ephemeris (e.g., orbital information), almanac data (e.g., satellite network synopsis, error correction), and the like. The ranging codes and the navigation data can be modulated onto a carrier wave and transmitted from a satellite to a satnav receiver. In some embodiments, the ranging codes and/or navigation data can be transmitted on more than one frequency, such as on L1 (1575.42 MHz) and at on L2 (1227.60 MHz). Transmission of the satnav satellite signals at multiple frequencies can provide the benefits of redundancy, resistance to jamming, and error correction. In various embodiments, a satnav receiver may be configured to receive signals transmitted at one, two, or more frequencies.

The satellite signals (e.g., GNSS signals) received by satnav receivers can be used to make measurements (also referred to as satnav measurements) such as related to time, distance, position, and the like. The satnav measurements can include code phase measurements and carrier phase measurements. Advantageously, the use of carrier phase measurements can provide measurements with centimeter level or sub-centimeter level (e.g., millimeter level) accuracy. Additionally, the satellite signals received from and/or by different entities can be differenced to reduce certain measurement errors, using any suitable differential processing techniques (e.g., single differencing, double differencing, or triple differencing techniques). For example, satellite signals received from different satellites can be differenced to derive satellite-differenced measurements, eliminating or mitigating receiver-related errors (e.g., receiver clock errors). Additionally or alternatively, satellite signals received by different receivers can be differenced to derive receiver-differenced measurements, eliminating or mitigating satellite-related errors (e.g., satellite clock errors) or errors caused by the propagation media (e.g., ionosphere or troposphere).

In some embodiments, location information (e.g., GNSS measurements, error corrections, etc.) can be transmitted between the controlling movable object 102 and the controllable movable object 104 in order to determine the baseline vector between the controlling movable object 102 and the controllable movable object 104. Such location information can be conveyed in one-way or two-way communication. In an example, the controllable movable object 104 can be configured to provide its satnav measurements to the controlling movable object 102, which can then calculate the difference between its own measurements and the received measurements (i.e., receiver-differenced measurements). In another example, the controlling movable object 102 can be configured to provide its satnav measurements to the controllable movable object 104, which can then calculate the difference between its own measurements and the received measurements (i.e., receiver-differenced measurements). In another example, the controlling movable object 102 and the controllable movable object 104 can be configured to exchange location information including satnav measurements in two-way communication.

A baseline change 108 between the controlling movable object 102 and the controllable movable object 104 can be determined by comparing a first baseline vector 106 measured at or near a first point in time, t1, and a second baseline vector 110 measured at or near a second point in time, t2. To simplify discussion, the baseline change 108 in FIG. 1 is shown as caused by a location change of the controlling movable object 102 alone while the controllable movable object 104 remains still. However, in general, the baseline change 108 can be caused by a location change of the controlling movable object 102, the controllable movable object 104, or both. The baseline change can be represented by a vector comprising a plurality of vector components along respective axes (e.g., X, Y, and/or Z) of a suitable coordinate system.

The baseline change 108 can be mapped to a corresponding state change 112 for the controllable movable object 104 based on a predetermined mapping function. A state of the controllable object can be related to, for example, a position, an orientation, or a movement of the controllable object. For instance, a baseline change vector of (3 cm, 4 cm, 5 cm) along the X, Y, and Z axes of a coordinate system may be mapped to a corresponding movement vector of (30 cm, 40 cm, 50 cm) for the controllable movable object 104 in the same coordinate system, or in a different coordinate system. In another example, the baseline change may be caused by a movement of the controllable movable object 104 and the corresponding state change for the controllable movable object 104 may be a reversal of that movement, so that the controllable movable object 104 maintains substantially the same location over time (e.g., in a hovering state).

Other examples of such a state change of the controllable movable object 104 can include a change in an orientation, a movement direction, a velocity or speed (linear or angular), an acceleration (linear or angular), a navigation path or pattern, an operation mode, and/or a functionality of the controllable movable object 104. For example, a speed of the controllable movable object 104 may increase or decrease by an amount that is calculated based on the predetermined mapping function and the baseline change vector. In another example, a heading of the controllable movable object 104 may change by an angle that is calculated based on the predetermined mapping function and the baseline change vector. In another example, the controllable movable object 104 may be flying in a circular flight path and a radius of the circular flight path may be changed according to the baseline vector change. In another example, the controllable movable object 104 may change from a first type of flight path (e.g., a straight path) to a second type of flight path (e.g., an "S" shaped path).

In some other examples, a state change of the controllable movable object 104 can include an activation, a deactivation, or otherwise a control of a functionality or a component of the controllable movable object 104. Examples of such functionalities can include automatic landing, automatic launch, hover, tracking of an object of interest (e.g., a person or a vehicle), obstacle avoidance, capturing of images (e.g., still images or videos), recording of audio signals, adjustment of a carrier of a payload, and the like. For example, when the baseline change is determined to match a predefined pattern (e.g., a "V" shape pattern), an imaging device onboard the controllable movable object 104 may be controlled to capture one or more images.

The baseline change vector can be provided as an input to a predetermined mapping function to obtain, as an output, the corresponding state change for the controllable movable object. Any suitable mapping function may be provided depending on the desired type of state change. For instance, the mapping function may map a vector to a vector, an angle of rotation, a change in speed, a change in acceleration, or any other state change such as discussed above. In some embodiments, besides the baseline change vector, the mapping function may also take as an input or otherwise incorporate considerations of context information in providing the output. Such context information can include temporal and/or spatial factors, characteristics of the controlling movable object 102 and/or the controllable movable object 104, a surrounding environment, and the like. For instance, given the same baseline change as an input, the mapping function may produce a different state change as an output depending on the time of the day (e.g., daytime versus night), the location of the controlling object or controllable object (e.g., indoor versus outdoor), a status of the controllable object (e.g., a battery level), and the like.

One or more mapping function may be stored as one or more instructions in a memory unit. The memory unit may be located on the controlled movable object 102, the controllable movable object 104, or a different device or system (e.g., a base station or a cloud computing device). In some embodiments, a default mapping function is provided. Alternatively, the mapping function may be dynamically selected from a plurality of mapping functions.

The selection of the mapping function may be based on any suitable criteria, such as related to time and/or location, characteristics of the controlling movable object 102 and/or the controllable movable object 104, a surrounding environment, or other context information. Different mapping functions may be selected given the same baseline change in different contexts. In an example, different mapping functions can correspond to different types of the controlling movable object 102 and/or the controllable movable object 104. Different object types may have different weights, dimensions, capacities, ranges, fuel types, propulsion mechanisms, and other characteristics. In another example, one of a plurality of different mapping functions may be selected for the same controlling movable object 102 or controllable movable object 104 depending on its current state, such as its current altitude, latitude, longitude, velocity, speed, orientation, heading, and/or flight path. The current state of the controlling movable object 102 or the controllable movable object 104 can also include status of one or more components of the movable controllable object such as its power supply, computer hardware or software, storage units, sensors, propulsion units, and the like. The current state of the movable object may be determined based on sensor data from one or more sensors onboard the movable object. In another example, different mapping functions may be selected based on the environment surrounding the controlling movable object 102 and/or the controllable movable object 104. For instance, different mapping functions may be selected depending on a weather condition, whether the movable objects are indoor or outdoor, a complexity of the surrounding environment (e.g., terrain characteristics, presence of obstacles, openness), a level of interference or SNR, and the like.

The control data for effecting the state change 112 of the controllable movable object 104 may generated by one or more processors on the controlling movable object 102 and transmitted to the controllable movable object 104. Alternatively, the control data for effecting the state change 112 may be generated by one or more processors on the controllable movable object 104. In some embodiments, a combination of the processors on the controlling movable object 102 and the controllable movable object 104 may be configured to generate the control data. Examples of the control data can include coordinates of a target position for the controllable movable object 104, movement vector or vectors for the controllable movable object 104, one or more linear or angular velocities of the controllable movable object 104 with respect to one or more axes, one or more linear or angular accelerations of the controllable movable object 104 with respect to one or more axes, commands for activating, deactivating, otherwise controlling one or more modules of the controllable movable object 104, and the like. Other examples of the control data can include commands activating, deactivating, or otherwise control a functionality, a routine, a process, a component, or a payload of the controllable movable object 104.

In some embodiments, the control data may be processed or executed by one or more processors or controllers onboard the movable controllable object 104 to generate control signals for one or more modules (e.g., propulsion units) of the controllable movable object 104 (e.g., to achieve a desired position and/or orientation of the movable controllable object 104). In some other embodiments, the control data may be processed or executed directly the one or more modules to be controlled (e.g., propulsion units, sensors).

In some embodiments, the processors onboard the controllable movable object 104 and/or the controlling movable object 102 may implement a control loop feedback mechanism (also referred to as a feedback loop control mechanism) such as a proportional-integral-derivative (PID) controller. The control loop feedback mechanism may be used to update a control variable based on a current state in order to achieve a desired effect. For instance, a PID controller can be configured to calculate an error value as the difference between a current state (e.g., a current baseline vector between the controlling movable object 102 and the controllable movable object 104, a current position, velocity, or acceleration of the controllable movable object) and a target state, and attempts to minimize the error value over time by adjusting a control variable (e.g., an angular velocity or a velocity of the controllable movable object 104). For instance, as shown in FIG. 1, after the state change 112, the controllable movable object 104 may be moved to position p4 122, and a current (third) baseline vector 114 can be calculated in a similar fashion as for the first baseline vector 106, discussed above. The current baseline vector 114 can be compared with a target baseline vector to determine an error value. The target baseline vector may be determined based on a target position or a target movement vector for the controllable movable object 104. The target position, target movement vector, or the target baseline vector may be determined based on the mapping function. Alternatively, the baseline vector 114 can be used to estimate a current position, which is compared with the target position to derive the error value.

A control variable (e.g., a velocity or acceleration of the controllable movable object 104) may be adjusted in more than one iterations to minimize the error value so as to achieve the target state. Generally, the more precisely the state can be measured, the more precise the error value can be measured, and the more precisely the control variable can be adjusted. Using the techniques described herein, the baseline vector between the controlling movable object 102 and the controllable movable object 104 can be measured at centimeter or sub-centimeter level accuracy. Accordingly, the techniques described herein can be used to provide centimeter level or sub-centimeter level control of the movable objects.

Figure 2:
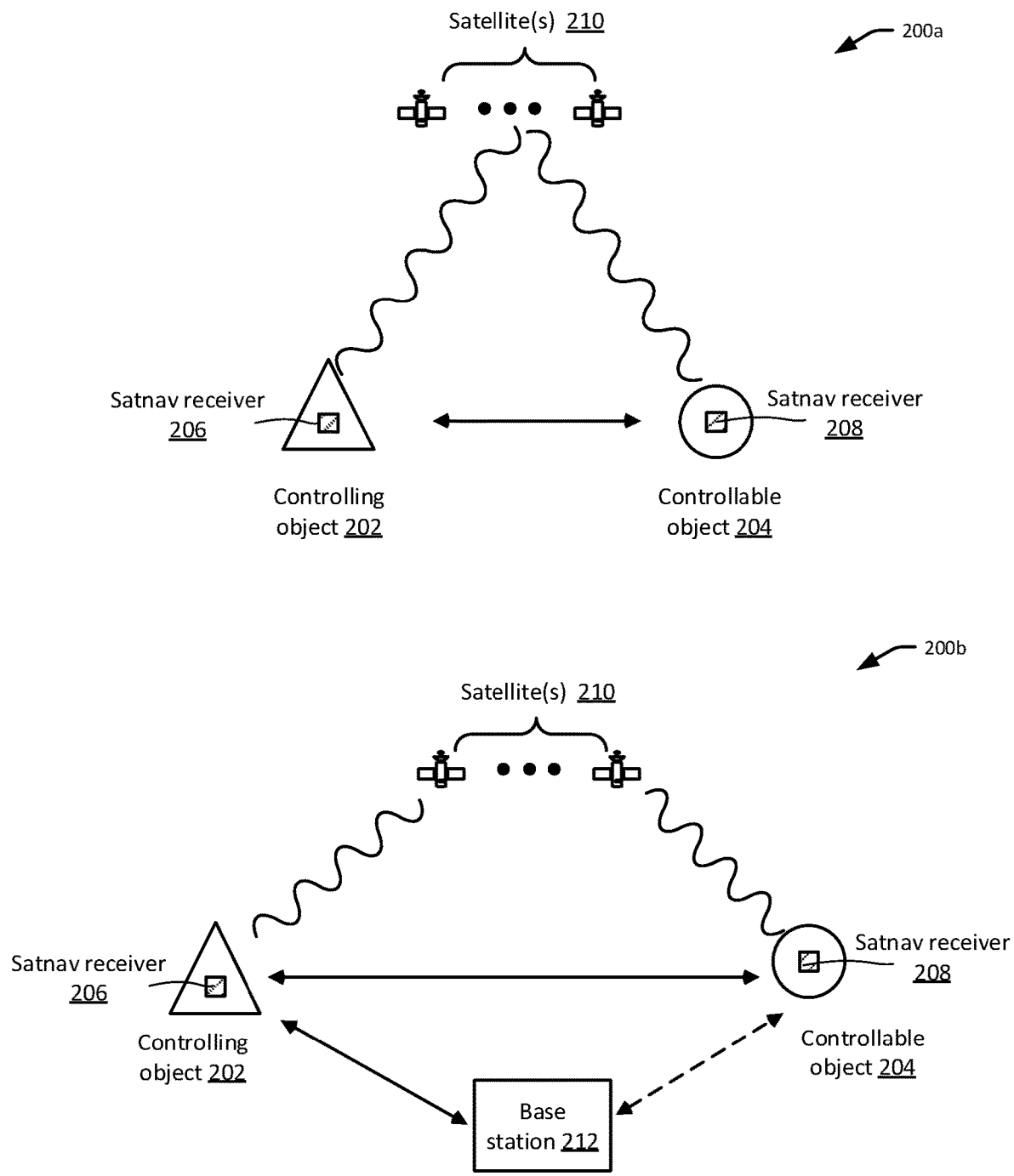
FIG. 2 illustrates exemplary systems for implementing the techniques described herein, in accordance with embodiments.

FIG. 2 illustrates exemplary systems for implementing the techniques described herein, in accordance with embodiments. In an exemplary system 200a, a baseline between a controlling object 202 and a controllable object 204 can be determined based on satellite signals received by a satnav receiver 206 of the controlling object 202 and satellite signals received by a satnav receiver 208 of the controllable object 204. The satnav receivers 206 and 208 are configured to receive satellite signals from one or more satellites 210. The satellite signals can be used, by one or more processors onboard the controlling object 202 and/or the controllable object 204, to make satnav measurements such as related to distance, position, and time. For instance, the satellite signals can be used to determine (including estimating) locations of the controlling object 202 and the controllable object 204. Additionally, the satellite signals can be used to determine a baseline between the controlling object 202 and the controllable object 204 as described herein.

The controlling object 202 and the controllable object 204 may be configured to communicate with each other. The communication may be one-way or two-way. The communication can utilize infrared, radio, WiFi, one or more of local area networks (LAN), wide area networks (WAN), point-to-point (P2P) networks, telecommunication networks, cloud communication, and the like. The communication between the controlling object 202 and the controllable object 204 can be used to obtain or enhance satnav measurements.

In some embodiments, the controlling object 202 may be configured to determine satnav measurements based on satellite signals received by the satnav receiver 206 and provide the satnav measurements to the controllable object 204. The controllable object 204 may be configured to determine satnav measurements based on satellite signals received by the satnav receiver 208. Additionally, the controllable object 204 may be configured to correct, calibrate, or otherwise improve accuracy of the its satnav measurements using the satnav measurements received from the controlling object 202. For instance, the satnav measurements provided by the controlling object 202 may include error information related to certain satellites or the propagation media. Such error information can be used by the controllable object 204 to correct its measurements related to those satellite or to the propagation media. In some other embodiments, controlling object 202 may be configured to correct, calibrate, or otherwise improve accuracy of the its satnav measurements using the satnav measurements received from the controllable object 202.

The satnav measurements can include or be used to determine a baseline between the controlling object 202 and the controllable object 208. A change in the baseline may be mapped to a state change for the controllable object 204. Control signals for the effecting the state change may be generated. In various embodiments, the baseline determination, mapping, and/or the control generation may be determined by one or more processors onboard the controlling object 202, one or more processors onboard the controllable object 204, or a combination of both.

For example, in an embodiment, the controlling object 202 may be configured to determine the baseline and a change thereof, for example, based on the measurements made by the controlling object 202 and the measurements made by the controllable object 204. Additionally, the controlling object 202 may be configured to map the baseline change to a state change for the controllable object 204, generate control commands for effecting the state change, and sending the control commands to the controllable object 204. The controllable object 204 may be configured to execute the control commands to achieve the state change. In some embodiments, the control commands can be directed to changing a position (position control commands), a velocity (velocity control commands), an acceleration (acceleration control commands), or an attitude (e.g., a title control or an orientation control) of the controllable object 204.

In another example, the controlling object 202 may be configured to determine the baseline and a change thereof, map the baseline change to a state change for the controllable object 204, and send the state change to the controllable object 204. The controllable object 204 may then generate control signals (e.g., for one or more propulsion units) for effecting the state change based on the received state change.

In another example, the controlling object 202 may be configured to determine the baseline and a change thereof and transmit the baseline and/or baseline change to the controllable object 204. The controllable object 204 may then map the baseline change to a state change and generate control signals for effecting the state change.

In another example, the controllable object 204 may be configured to determine the baseline and a change thereof, for example, based on the measurements made by the controlling object 202 and the measurements made by the controllable object 204. Additionally, the controllable object 204 may be configured to map the baseline change to a state change for the controllable object 204 and generate control signals for effecting the state change.

In some embodiments, the control signals for effecting the state change can be generated by a control loop feedback mechanism (e.g., PID controller). The control loop feedback mechanism can be implemented by processors onboard the controllable object 204, the controlling object 202, or both.

Still referring to FIG. 2, in another exemplary system 200b, the baseline between the controlling object 202 and a controllable object 204 can be determined by a base station 212. The base station 212 can include any computing device (e.g., mainframe server, desktop computer, laptop, tablet, mobile phone) or any cloud-based computing service. The controllable object 202 and the controllable object 204 can be configured to receive satellite signals from the satellite 210 as discussed in the system 200a. In addition, the controllable object 202 and/or the controllable object 204 can be configured to communicate with the base station 212 using any suitable communication channel. For example, the controlling object 202 and/or the controllable object 204 can be configured to provide measurement data (e.g., satnav measurements) to the base station 212. The base station 212 can be configured to calculate the baseline between the controlling object 202 and the controllable object 204 based on the received measurement data.

In some embodiments, the base station 212 may be configured to transmit the baseline information to the controlling object 202 and/or the controllable object 204, which may be configured to determine the corresponding state change for the controllable object 204 using a predetermined mapping function. In some other embodiments, the base station 212 may determine a state change corresponding to a baseline change between the controlling object 202 and the controllable object 204, and send information about the state change to the controlling object 202 and/or the controllable object 204, which then generate the corresponding control signals for effecting the state change. In some other embodiments, the base station 212 may be configured to determine a state change corresponding to a baseline change between the controlling object 202 and the controllable object 204, generate control commands for effecting the state change, and send the control commands to the controllable object 204 and/or the controlling object 202. In some embodiments, the communication between the base station 212 and the controllable object 204 may be optional (as denoted by the dotted line in FIG. 2).

Figure 3:
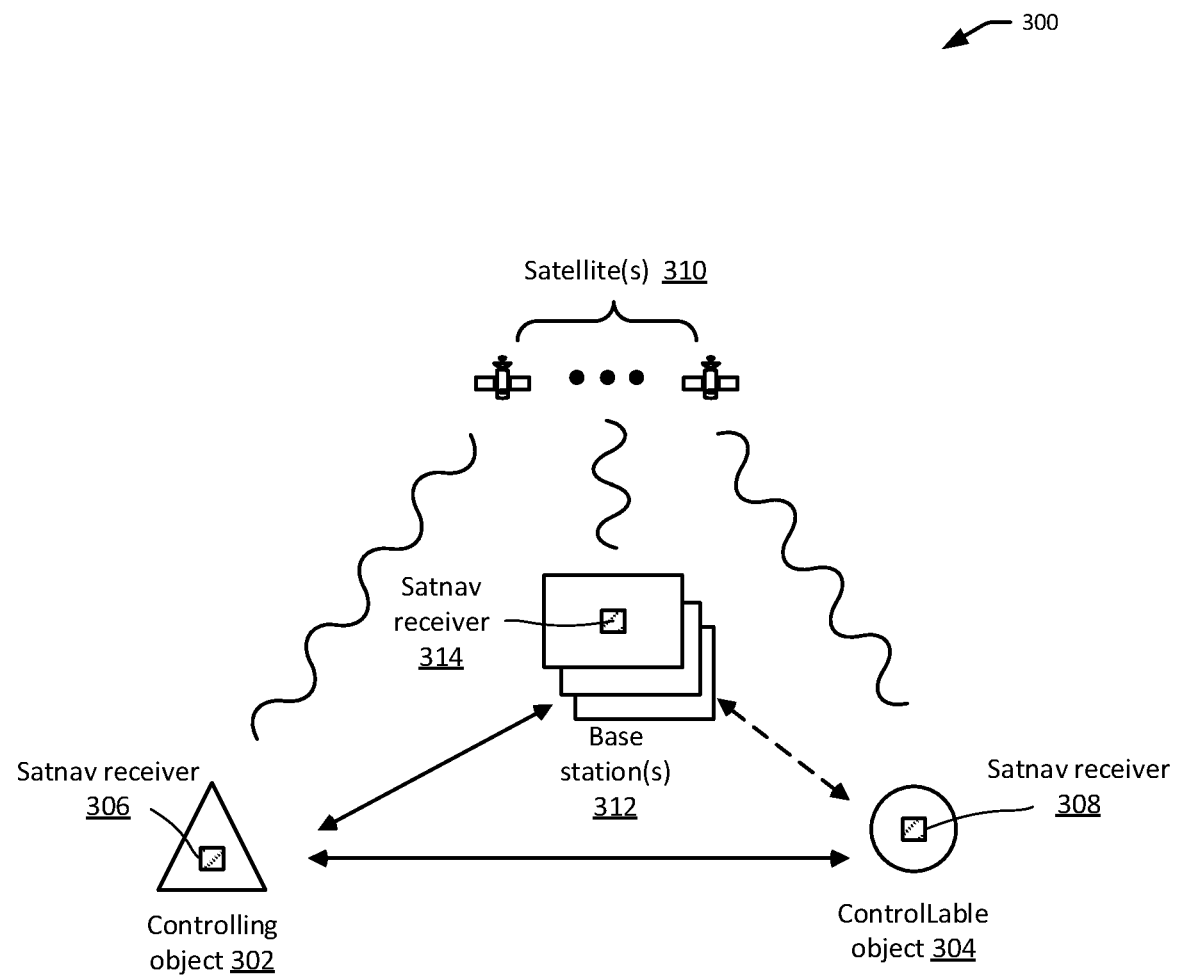
FIG. 3 illustrates additional exemplary system for implementing the techniques described herein, in accordance with embodiments.

FIG. 3 illustrates another exemplary system 300 for implementing the techniques described herein, in accordance with embodiments. As illustrated, the controlling object 302 and/or the controllable object 304 can be configured to communicate with one or more base stations 312. The one or more base stations 312 may each include at least satnav receivers 314 configured to communicate with one or more satellites 310. Each of the base stations 312 may be configured to broadcast information including the base station's known location as well as satnav measurements (e.g., pseudoranges) based on signals received by its satnav receivers 314. The broadcast information may be received by movable objects such as the controlling object 302 and/or the controllable object 304. The broadcast information may be used for correcting or otherwise enhancing satnav measurements obtained by the movable objects. For instance, the broadcast information may be used to correct satellite related errors (e.g., satellite clock bias, satellite orbital error), account for ionospheric and/or tropospheric delay, resolve carrier phase ambiguities, and the like. Each of the base stations 312 may be configured to broadcast within a certain range (e.g., service area) and multiple base stations 312 may form a network of base stations (e.g., Network RTK, Wide Area Real Time Kinematics (WARTK), differential GPS (DGPS) network) to provide wider coverage.

The controlling object 302 can carry a satnav receiver 306 that is configured to receive satellite signals from one or more satellites 310. The controllable object 304 can carry a satnav receiver 308 that is configured to receive satellite signals from one or more satellites 310. The satellite signals can be used to determine satnav measurements. Additionally, the satnav measurements can be corrected, augmented, enhanced, or otherwise modified based on broadcast information from one or more base stations 312. The communication between the controlling object 302 and the base stations 312 can be one-way (e.g., broadcast only from the base stations 312), or two-way. The communication between the controllable object 304 and the base stations 312 can be one-way (e.g., broadcast only from the base stations 312), or two-way.

The controlling object 302 and/or the controllable object 304 may be configured to determine the baseline between the controlling object 302 and the controllable object 304 based on their satnav measurements. For example, in an embodiment, the controlling object 302 may be configured to determine a first baseline between the controlling object 302 and a base station 312 (e.g., with centimeter or sub-centimeter level accuracy) based on the satellite signals as well as broadcast information from the base station 312. Likewise, the controllable object 304 may be configured to determine a second baseline between the controllable object 304 and a base station 312 (e.g., with centimeter or sub-centimeter level accuracy) based on the satellite signals as well as broadcast information from the base station 312. Thus, the baseline between the controllable object 302 and the controllable object 304 can be determined (e.g., by one or more processors onboard the controlling object 302 and/or the controllable object 304) based on the first baseline and the second baseline. Alternatively, the controlling object 302 and the controllable object 304 may each determine its own location based on satellite signals and broadcast information from the base station. The locations of the controlling object 302 and the controllable object 304 can then be used to determine the baseline between the controlling object 302 and the controllable object 304. Regardless of how the baseline is determined, changes in the baseline between the controlling object 302 and the controllable object 304 can be detected and mapped to corresponding state changes for the controllable object 304 as discussed elsewhere herein.

In another embodiment, instead of using a baseline change between the controllable object controlling object 302 and the controllable object 304 to control the controllable object 304, a location change of the controlling object 302 may be used to control the controllable object 304. In such an embodiment, the communication between the controllable object 304 and the base station 312 may be optional. The location change of the controlling object 302 may be determined by comparing the baseline between the controlling object 302 and the base station 312 at different points in time. Alternatively, the location change of the controlling object 302 may be determined by comparing the locations (e.g., longitude and latitude) of the controlling object 302 at different points in time. Subsequently, the location change of the controlling object 302 can be mapped to a corresponding state changes for the controllable object 304 in a similar fashion as the mapping between the baseline change and the state change, as discussed elsewhere herein.

In yet another embodiment, a location change of the controllable object 304 may be used to control the controllable object 304. The location change of the controllable object 304 may be determined by comparing the baseline between the controllable object 304 and the base station 312 at different points in time. Alternatively, the location change of the controllable object 304 may be determined by comparing the locations (e.g., longitude and latitude) of the controllable object 304 at different points in time. Subsequently, the location change of the controllable object 304 can be mapped to a corresponding state changes for the controllable object 304 in a similar fashion as for vector change, as discussed elsewhere herein.

Figure 4:
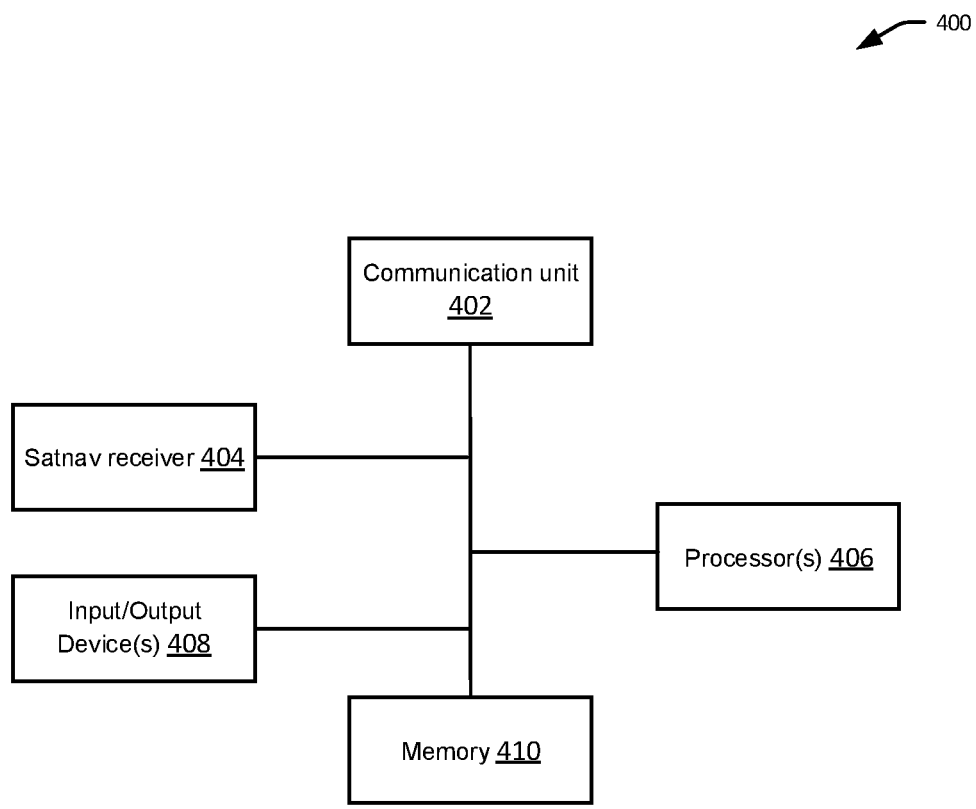
FIG. 4 illustrates an exemplary controlling object, in accordance with embodiments.

FIG. 4 illustrates an exemplary controlling object 400, in accordance with embodiments. The controlling object can include a communication unit 402, a satnav receiver 404, one or more processors 404, one or more input/output devices 408, and a memory 410, all interconnected via a system bus.

The communication unit 402 can be configured to transmit and/or receive data from one or more external devices (e.g., a controllable object, or a base station). Any suitable means of communication can be used, such as wired communication or wireless communication. For example, the communication module 1310 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. In some examples, the communication unit 402 can be configured to transmit satnav measurements from the satnav receiver 404. In some embodiments, the communication unit 402 may be configured to receive satnav measurements or other sensing data from one or more external devices such as a controllable object and/or a base station. The communication unit 402 can also be configured to transmit processing results (e.g., control commands) produced by the one or more processors 406.

The satnav receiver 404 can be configured to acquire and track satellite signals. Acquiring a signal is the process of determining the frequency and code phase (both relative to receiver time) when it was previously unknown. Tracking is the process of continuously adjusting the estimated frequency and phase to match the received signal as close as possible and therefore is a phase locked loop. The satnav receiver 404 can be configured to process the satellite signals received on its antenna to determine information related to position, velocity and/or timing. For example, the satellite signals received by the antenna may be amplified, down converted to baseband or intermediate frequency, filtered (e.g., to remove frequencies outside the intended frequency range) and digitalized. The order of these steps may be different than the above-mentioned order. The digitized satellite signals may include or be used to produce satnav measurements such as those described herein.

Besides the satnav receiver 404, the controlling object 400 may optionally include additional sensors such as an IMU, a compass, an image sensor, and the like. The sensing data from these additional sensors may be combined with the satnav measurements for controlling the controllable object.

The one or more processors 406 can include a central processing unit (CPU), a microprocessor, a field-programmable gate array (FPGA), an application—specific integrated circuit (ASIC), and the like. The processors 406 can be operatively coupled to a memory 410. The memory 410 can store logic, code, and/or program instructions executable by the processors 406 for performing one or more processes discussed herein (e.g., process 500 of FIG. 5 and process 7 of FIG. 7). The memory can include one or more non-transitory storage media (e.g., removable media or external storage such as an SD card or random access memory (RAM)). The memory can also store data such as satnav measurement data from the satnav receiver 404, processing results produced by the processors 406, data related to one or more mapping functions, sensing data, and the like.

The one or more input/output devices 408 can include one or more input devices to receive user input such as a touch screen, a joystick, a button, a keyboard, a mouse, a microphone, a camera, a biometric reader, and the like. For instance, the input devices may allow a user to configure parameters of one or more mapping functions. The input/output devices 408 can include one or more output devices such as a display, a speaker, a such as a touch screen, a joystick, a button, a keyboard, a mouse, a microphone, and the like.

According to embodiments, a controllable movable object can be controlled based on a baseline change between the controllable movable object and a controlling movable object. The controllable movable object can include a UAV, or any other movable object discussed elsewhere herein. The controlling movable object can include a remote control terminal (or remote controller), another UAV, a mobile device, or any control device.

Figure 5:
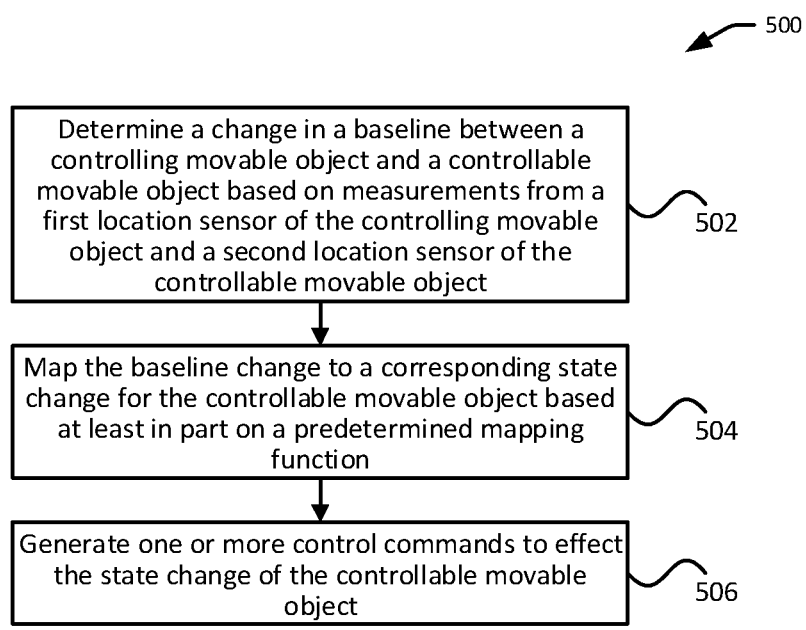
FIG. 5 illustrates an exemplary process for controlling an object, in accordance with embodiments.

FIG. 5 illustrates an exemplary process 500 for controlling an object, in accordance with embodiments. The object may be any controllable movable object (e.g., a UAV) as described herein. Some or all aspects of the process 500 (or any other processes described herein, or variations and/or combinations thereof) may be performed by one or more processors onboard and/or offboard a controlling object (e.g., a remote control terminal, a UAV). Some or all aspects of the process 500 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

At block 502, a change in a baseline vector between a controlling movable object and a controllable movable object (also referred to as a baseline change vector, a baseline change vector, or a baseline change) can be determined. The determination can be based at least in part on measurements from a first location sensor of the controlling movable object and a second location sensor of the controllable movable object. The first location sensor and the second location sensor can be satnav receivers discussed herein. The baseline change can comprise calculating a current baseline vector between the controlling and controllable objects and comparing the current baseline vector with a previously-measured baseline vector. For example, the previously-measured baseline vector can be subtracted from the current baseline vector, or the current baseline vector can be subtracted from the previously-measured baseline vector, to obtain the baseline change vector. More detailed discussion of baseline determination is provided in connection with FIGS. 6-7.

At block 504, the baseline change determined above can be mapped to a corresponding state change for the controllable movable object based at least in part on a predetermined mapping function. In some embodiments, the mapping function may be selected from a plurality of mapping functions based on a status or one or more characteristics of the controlling object, the controllable object, and/or the environment. More detailed discussion regarding mapping functions is provided in connection with FIGS. 8-9.

At block 506, one or more control commands can be generated to effect the state change of the controllable movable object. The control commands can be directed to changing a position (position control commands), a velocity (velocity control commands), an acceleration (acceleration control commands), or an attitude (e.g., a title control or an orientation control) of the controllable object. Exemplary control commands may include a desired position or position difference, a desired velocity or velocity difference, a desired acceleration or acceleration difference, a desired angle of rotation, and the like.

Optionally, after the generation and/or execution of the control commands, the updated baseline between the controlling object and the controllable object can be measured and used, e.g., by a feedback loop controller (e.g., a PID controller), to enforce precise control of the state of the controllable object. For instance, the updated baseline may indicate a deviation of the controllable object from a desired position. The desired position may have been previously determined based on the mapping function. Based on the deviation, additional control signals can be generated to reduce the deviation. Such a feedback control loop can continue iteratively until the deviation is below a predetermined threshold or for a predetermined period of time.

Figure 10:
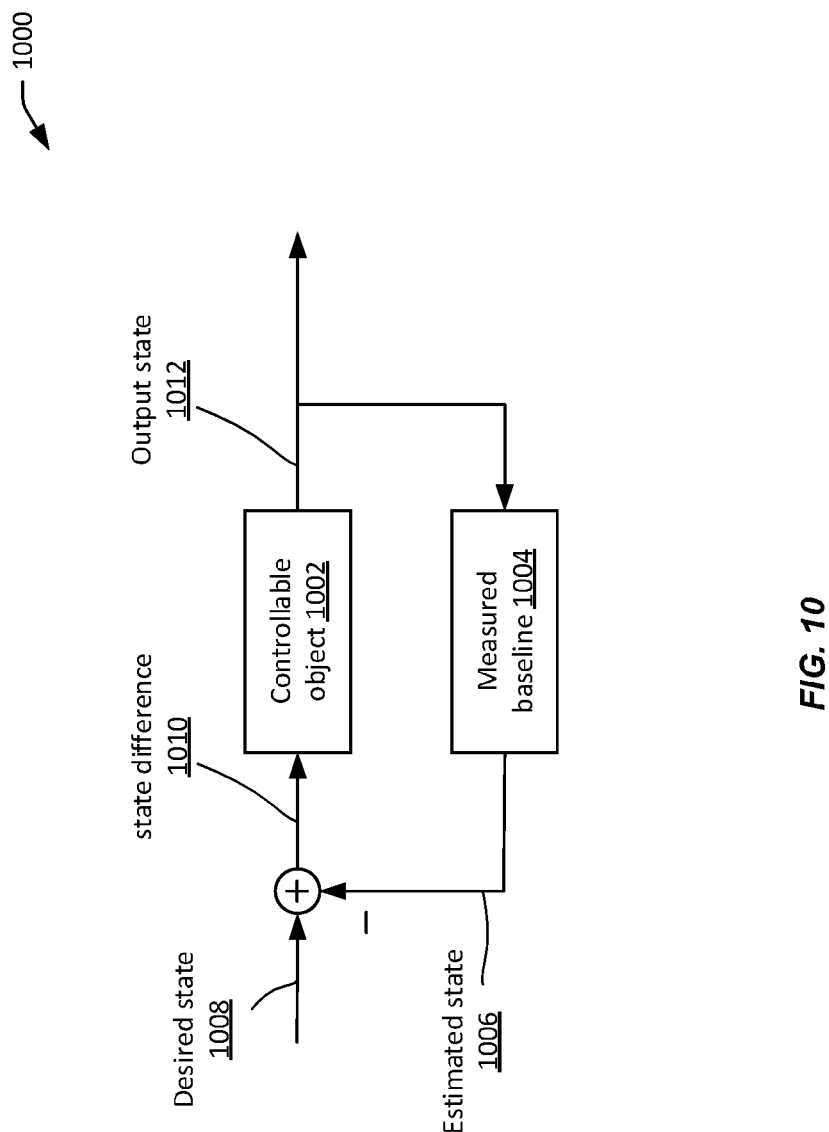
FIG. 10 illustrates an exemplary process for controlling a state of a controllable object, in accordance with embodiments.
Figure 11:
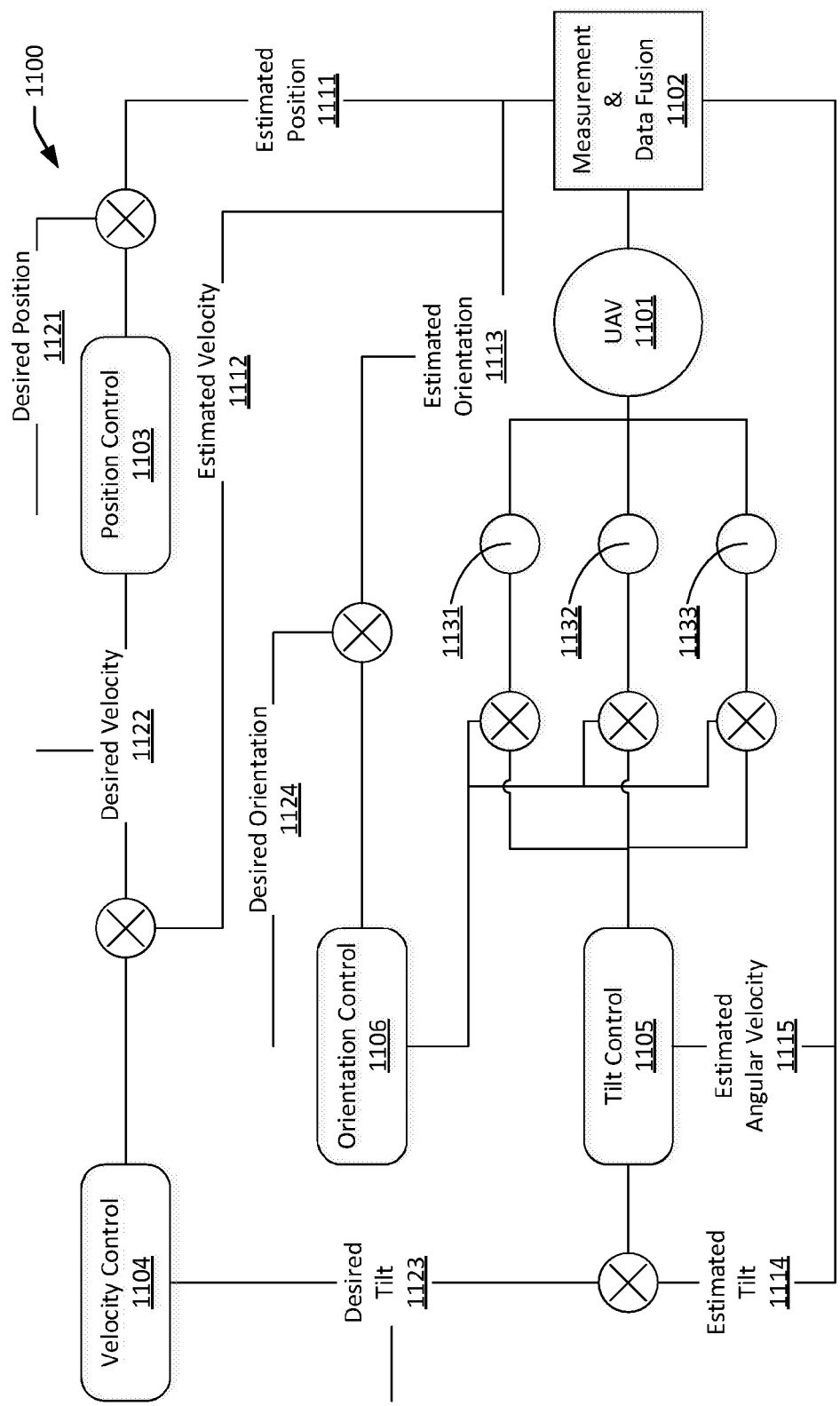
FIG. 11 illustrates an exemplary control scheme for controlling a UAV, in accordance with embodiments.

In some embodiments, the feedback control loop described herein can be implemented by one or more processors onboard the controllable object. That is, the controllable object may be configured to determine the updated baseline based on updated satnav measurements from either or both the controlling object and the controllable object (as described elsewhere herein), and generate additional control signals to effect the desired state. In some other embodiments, the feedback control loop can be implemented at least in part by one or more processors onboard the controlling object. For instance, the calculation of the updated baseline may be performed by the processors of the controlling object based on updated satnav measurements from either or both the controlling object and the controllable object. The update baseline may then be transmitted to the controllable object, which then generates the further control signals. Alternatively, the controlling object may generate the control signals and then transmit the control signals to the controllable object. FIGS. 10-11 provide more detailed discussion of the feedback control loop.

Figure 6:
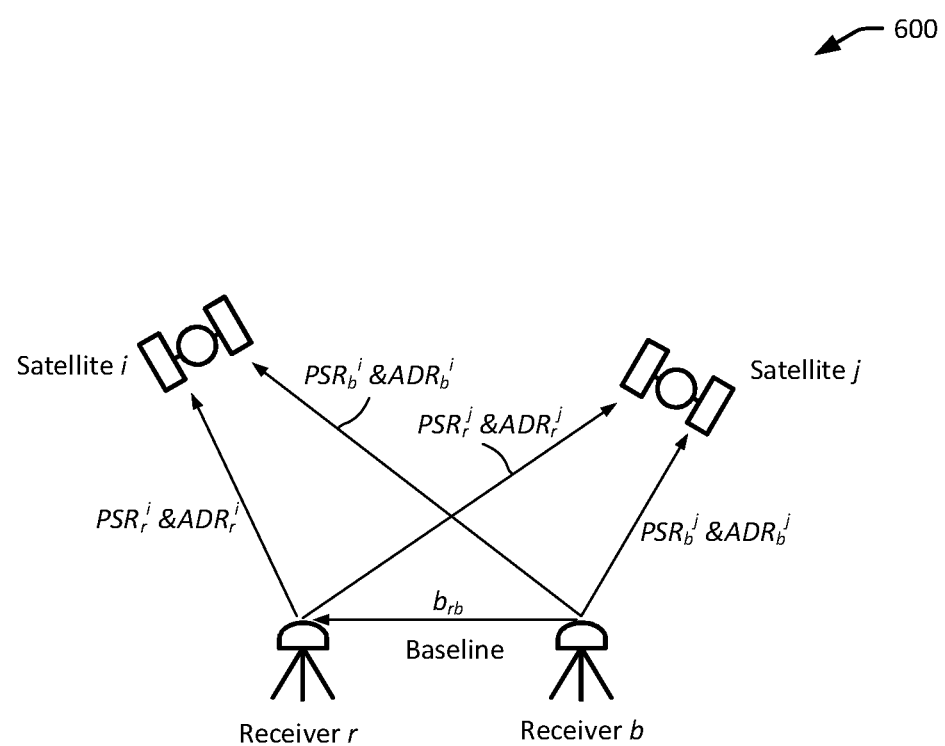
FIG. 6 illustrates a pair of exemplary receivers, in accordance with embodiments.

FIG. 6 illustrates a pair of exemplary receivers, r and b, with respective satnav measurements with respect to a pair of satellites i and j, in accordance with embodiments. The satnav receiver r and the satnav receiver b can be located respectively on a controlling object and a controllable object such as described in FIGS. 1-2. Alternatively, one of the satnav receiver r and the satnav receiver b can be located on a base station such as described in FIG. 3, and the other receiver can be located on a controlling object or controllable object.

Each receiver can be configured to obtain measurements with respect to each of a plurality of satellites. The satellite signals received by the satnav receivers can include ranging codes and navigation messages as described herein. Based on satellite signals, a satnav receiver can produce measurements or observations of certain observables for a given satellite, including a pseudorange (PSR) and a carrier phase measurement (e.g., accumulated Doppler range (ADR)).

For instance, as illustrated in FIG. 6, the receiver r can provide a set of measurements with respect to satellite i, including the pseudorange, $PSR_r^i$, and the carrier phase measurement, $ADR_r^i$, between the receiver r and the satellite i. Receiver r can also provide a set of measurements with respect to satellite j, including the pseudorange, $PSR_r^j$, and the carrier phase measurement, $ADR_r^j$, between the receiver r and the satellite j. Likewise, the receiver b can provide two sets of measurements with respect to satellites i and j, the first set of measurements for satellite i including $PSR_b^i$ and $ADR_b^i$, and the second set of measurements for satellite j including $PSR_b^j$ and $ADR_b^j$. Based on the satnav measurements determined by the receivers, a baseline $b_{rb}$ between receiver r and receiver b can be determined.

Figure 7:
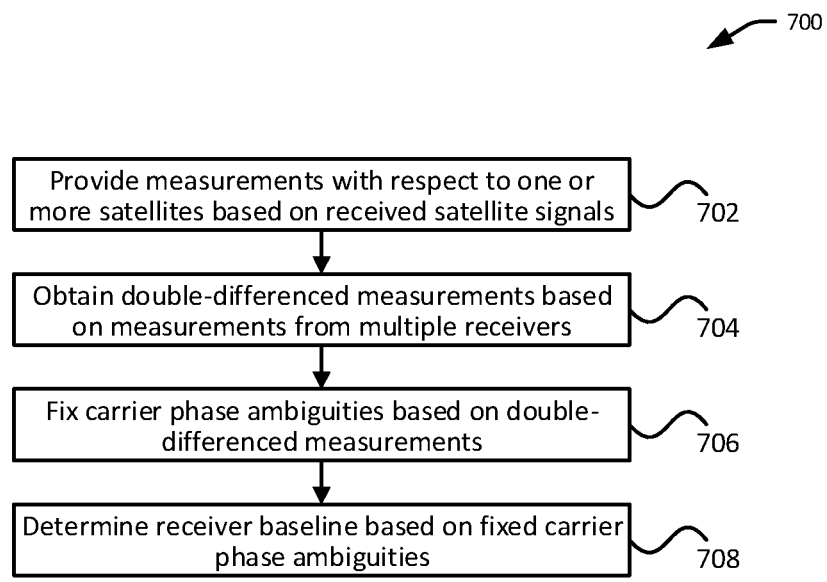
FIG. 7 illustrates an exemplary process for determining a baseline between a pair of receivers, in accordance with embodiments.

FIG. 7 illustrates an exemplary process 700 for determining a baseline between a pair of receivers, in accordance with embodiments. The pair of receivers may be similar to the satnav receivers r and b described in FIG. 7 or elsewhere herein. In some embodiments, aspect of the process 700 can be implemented by one or more processors onboard a controlling object. Alternatively, aspects of the process 700 may be implemented by a controllable object, a base station, or any combination of the above.

At block 702, measurements with respect to one or more satellites can be provided based at least in part on received satellite signals. The measurements can include multiple sets of satnav measurements, each set corresponding to a given satellite. Each set of measurement can be obtained after a receiver successfully locks the given satellite to track satellite signals therefrom. The measurements can include pseudorange measurements (PSR) and carrier phase measurements (ADR) discussed in FIG. 6. For instance, PSR and ADR can be expressed using the following equations:

$$PSR = R + O + I + T + M + (\delta t_u - \delta t_s) + \varepsilon_{PSR} \qquad (1)$$

$$ADR = \frac{1}{\lambda}[R + O - I + T + M + (\delta t_u - \delta t_s)] + N + \varepsilon_{ADR} \qquad (2)$$

In the above equations, λ is the carrier wavelength; O, I, T, and M are errors caused respectively by the orbit, ionospheric delay, tropospheric delay, and multipath effects; $\delta t_u$ and $\delta t_s$ are errors associated with the receiver clock and the satellite clock, respectively; N is the integer ambiguity of the carrier phase; $\varepsilon_{PSR}$ and $\varepsilon_{ADR}$ are receiver noises respectively associated with the pseudorange measurement and the carrier phase measurement, respectively.

The pseudorange measurement measures a range or distance between the satnav receiver and a satellite. The pseudorange measurement can be determined based on a correlation of code carried on a modulated carrier wave received from a satellite with a replica of that same code generated in the satnav receiver. A carrier phase measurement measures the range between a satellite and the satnav receiver but is expressed in units of cycles of the carrier frequency. The pseudorange measurement is typically made with a lower accuracy (e.g., in the order of meters) than the carrier phase measurement, which can be made with a higher accuracy (e.g., in the order of millimeters). However, the integer number of cycles or wavelengths (e.g., N in the above equation (2)) between a satellite and a receiver, or the carrier phase ambiguities, is not measurable and thus unknown. Thus, the carrier phase ambiguities need to be fixed or resolved using any suitable ambiguity resolution techniques, such as described below.

The satnav measurements can also include errors from any of the following categories: (1) satellite related errors, e.g., orbital errors, satellite clock errors, etc.; (2) signal propagation related errors, e.g., ionospheric delay, tropospheric delay, and multipath effects; and (3) receiver-related errors, e.g., receiver clock errors, receiver measurement noise, etc. Some or all of these errors can be removed using double differencing techniques discussed below.

At block 704, double-differenced measurements can be obtained based on measurements from multiple receivers. For instance, a controlling object can be configured to receive measurements from a controllable object, or a base station. Or, a controllable object can be configured to receive measurements from a controlling object, or a base station. Or, a base station can be configured to receive measurements from a pair of satnav receivers respectively located at a controlling object and a controllable object.

Optionally, each satnav receiver can be configured to determine its location based on its own measurements (single point positioning). For instance, a satellite position can be calculated based on time and ephemeris information (e.g., orbital parameters). The receiver position can be calculated based on the satellite position and the pseudorange. In some embodiments, measurements of a receiver with respect to multiple satellites can be used to derive satellite-differenced (single-differenced) measurements. For example, using four satellite positions and their corresponding pseudorange, a receiver's position can be determined using nonlinear weighted iterative lease squares. While the errors in the pseudorange measurements (e.g., equation (1)) can be partially compensated using error models, the precision of single point positioning, evening with the error-compensated measurements, is typically at or around 10 meters or less, still too low to provide precise control of controllable objects with satisfactory results.

In general, the measurements can be differenced to remove or cancel out errors or ambiguities. For example, the measurements can be double-differenced to obtain double-difference difference measurements. That is, measurements from multiple satellites can be differenced to obtain satellite-differenced measurements (single-differenced measurements) in order to reduce or eliminate receiver-related biases or errors. Similarly, measurements from multiple receivers (e.g., from the controlling object and from the controllable objects) can be differenced obtain receiver-differenced measurements (single-differenced measurements) in order to reduce or eliminate satellite-related or signal propagation related errors. The above-described satellite-differencing and receiver-differencing can be combined to obtain double-differenced measurements. For instance, satellite-differenced measurements may be receiver-differenced to obtain double-differenced measurements. Alternatively, receiver-differenced measurements may be satellite-differenced to obtain double-differenced measurements. In some other embodiments, the measurements may be differenced more than twice (e.g., triple-differenced).

In an example, receiver-differenced (single-differenced) measurements for pseudorange and ADR with respect to satellite i can be expressed using the following equations (3) and (4), respectively.

$$PSR_{rb}^{(i)} = R_{rb}^{(i)} + c\delta t_{ur} + \varepsilon_{PSR} = -I_r^{(i)}.b_{rb} + c\delta t_{ur} + \varepsilon_{PSR} \qquad (3)$$

$$ADR_{rb}^{(i)} = \qquad (4)$$
$$\frac{1}{\lambda}R_{rb}^{(i)} + f\delta t_{ur} + N_{rb}^{(i)} + \varepsilon_{ADR} = -\frac{1}{\lambda}I_r^{(i)}.b_{rb} + f\delta t_{ur} + N_{rb}^{(i)} + \varepsilon_{ADR}$$

In the above equations (3) and (4), $R_{rb}^{(i)}$ is a single-differenced geometric distance between receiver and satellite antennas, c is the speed of light, λ is wavelength, f is carrier frequency, $\delta t_{ur}$ is a single-differenced clock error of receivers, $\varepsilon_{PSR}$ and $\varepsilon_{ADR}$ are single-differenced receiver noise of PSR and ADR, respectively, $N_{rb}^{(i)}$ is the single-differenced ambiguities integer, $I_r^{(i)}$ is the observed vector between the receiver r and the satellite i, and $b_{rb}$ is the baseline vector between receiver r and receiver b.

The double-difference measurements, pseudorange and ADR, with respect to satellite i and satellite j can be expressed using the following equations (5) and (6), respectively.

$$PSR_{rb}^{(ij)} = R_{rb}^{(ij)} + \varepsilon_{PSR} = -(I_r^{(i)} - I_r^{(j)})b_{rb} + \varepsilon_{ADR} \qquad (5)$$

$$ADR_{rb}^{(ij)} = R_{rb}^{(ij)} + \lambda N_{rb}^{(ij)} + \varepsilon_{ADR} = -(I_r^{(i)} - I_r^{(j)})b_{rb} + \lambda N_{rb}^{(ij)} + \varepsilon_{ADR} \qquad (6)$$

In the above equations (5) and (6), $PSR_{rb}^{(ij)}$ and $ADR_{rb}^{(ij)}$ are the double-differenced PSR and ADR respectively, $R_{rb}^{(ij)}$ is the double-differenced geometric distance between receiver and satellite antennas, and $N_{rb}^{(ij)}$ is the double-differenced ambiguities integer.

At block 706, carrier phase ambiguities can be fixed based on the double-differenced measurements. Carrier phase measurements provide a higher level of accuracy (e.g., at centimeter level or millimeter level) than pseudorange measurements. However, the existence of ambiguities within the carrier phase measurements prevents the use of such measurements for single point positioning. The carrier phase ambiguities can be resolved or fixed using double-differenced (e.g., receiver-differenced and satellite-differenced)

measurements between pairs of receivers and satellites, in order to cancel out the fractional part of the ambiguities.

Any suitable ambiguity fixing techniques can be used. In an embodiment, a floating-point solution of single-difference ambiguities can be estimated based on the single-differenced measurements, using Kalman filter or similar techniques. Next, the single ambiguities are converted to double ambiguities (e.g., $N_{rb}^{(ij)}$ in equations (5) and (6) above) using a single-difference-to-double-difference conversion matrix, such as D shown below:

$$D = \begin{bmatrix} 1 & -1 & 0 & \ldots & 0 \\ 1 & 0 & -1 & \ldots & 0 \\ \vdots & \vdots & \vdots & \ddots & \vdots \\ 1 & 0 & 0 & \ldots & -1 \end{bmatrix} \quad (7)$$

At block 708, a baseline between a pair of receivers can be determined based at least in part on the fixed carrier phase ambiguities. For instance, the above equations (5) and (6) can be solved to determine the baseline $b_{rb}$, given the fixed integer number of double-differenced ambiguities (e.g., $N_{rb}^{(ij)}$ that is determined in block 706. Advantageously, centimeter or sub-centimeter level accuracy can be provided using the double-differenced carrier phase measurements.

Figure 8:
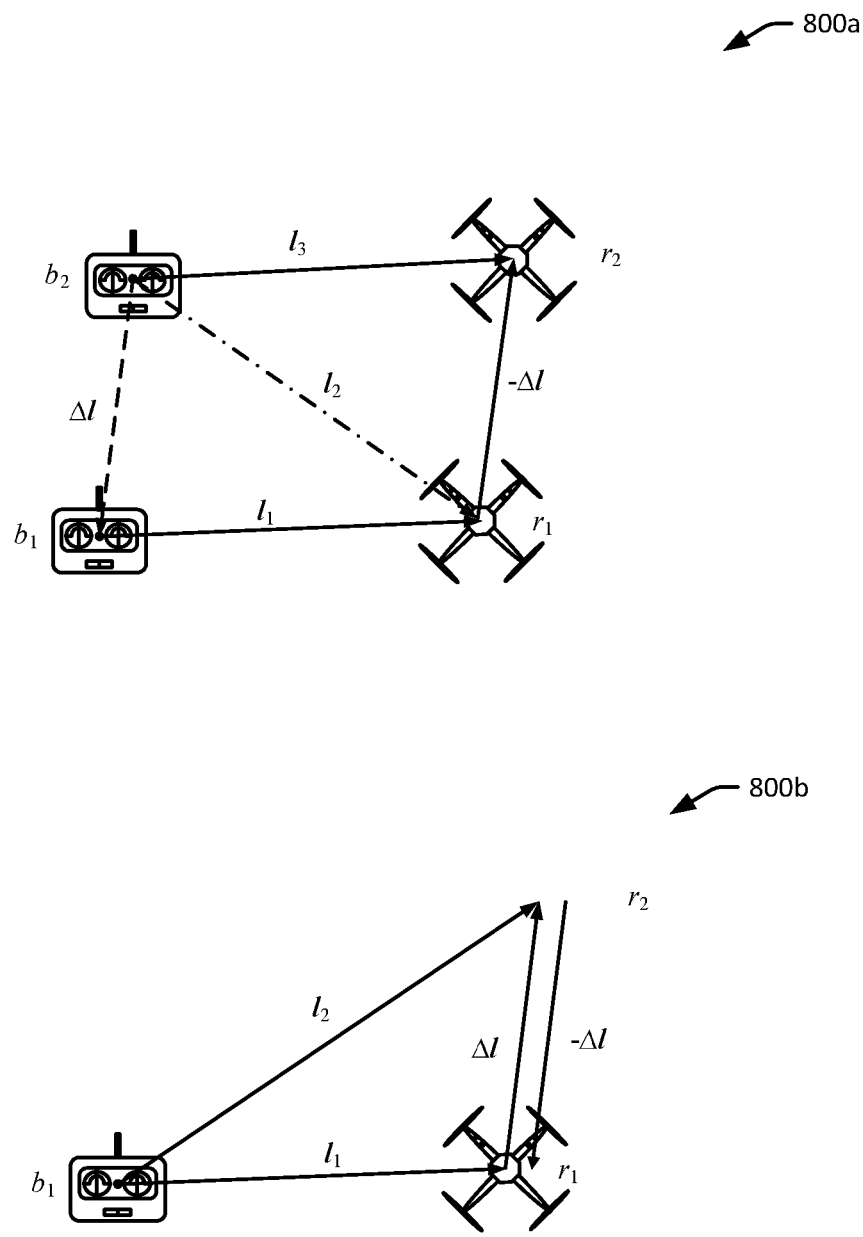
FIG. 8 illustrates exemplary control methods based on baseline change, in accordance with embodiments.
Figure 9:
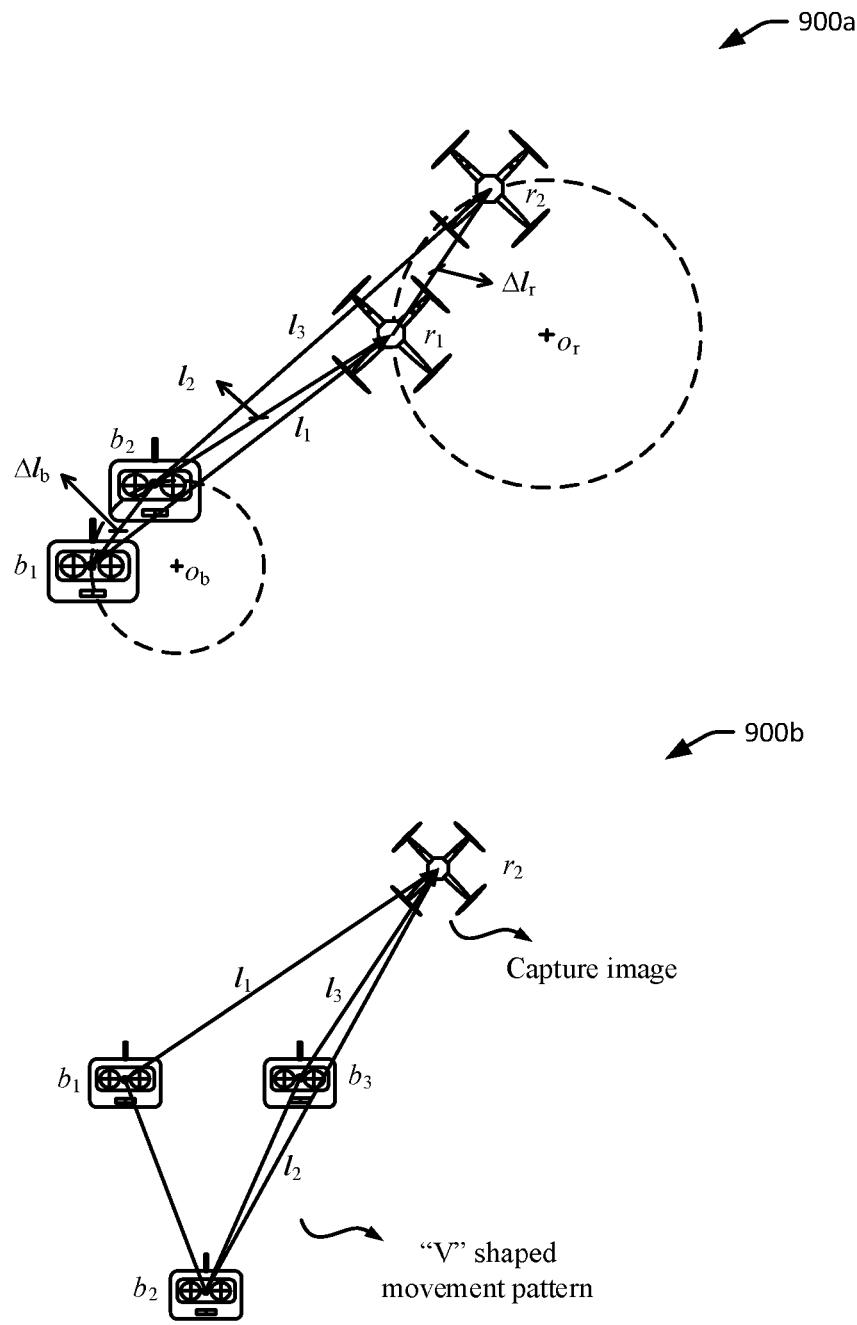
FIG. 9 illustrates additional exemplary control methods based on baseline change, in accordance with embodiments.

Once a baseline is determined between a pair of receivers (e.g., located respectively at a controlling object and a controllable object), it can be compared with a previously-determined baseline to determine a baseline change. The baseline change can be mapped to a corresponding state control for the controllable object based at least in part on a predetermined mapping function. FIGS. 8-9 illustrate exemplary methods for controlling a controllable object based at least in part on a baseline change between the controllable object and a controlling object, in accordance with embodiments. While FIGS. 8-9 illustrate the controlling object as a remote controller, it is understood that the controlling object can include any object capable of controlling another object. For instance, the controlling object can be a UAV itself. Likewise, while FIGS. 8-9 illustrate the controllable object as a UAV, it is understood that a controllable object can include any movable object discussed herein that is capable of being controlled by an external device.

In some embodiments, the baseline change can be used to implement precise 3-dimentional dimentional (3D) position control. For instance, the mapping function can map a baseline change to one or more corresponding position control commands for moving the controllable object along one, two, or three axes. For instance, a baseline change of 3 cm, 4 cm, 5 cm along the X, Y, and Z axes of a coordinate system may be mapped to a corresponding movement vector of 30 cm, 40 cm, 50 cm for the controllable object in the same or a different coordinate system. In another example, the baseline change may be caused by a movement of the controllable object and the corresponding state change for the controllable object may be a reversal of that movement, so that the controllable object maintains substantially the same location over time (e.g., in a hovering state).

FIG. 8 illustrates exemplary control methods based on a baseline change, in accordance with embodiments. As illustrated, the control methods can be used to maintain a predetermined spatial relationship (e.g., a constant baseline vector) between a controllable object and a controlling object.

As shown in scenario 800*a*, when a controlling object moves from position $b_1$ to position $b_2$, and the controllable object remains at position $r_1$, the baseline between the controlling object and the controllable object changes from $l_t$ to $l_2$, resulting in a baseline change, $\Delta l = l_2 - l_1$. To maintain the constant baseline vector between the objects, the baseline change, $\Delta l$, may be provided to a control loop feedback mechanism such as illustrated in FIGS. 10-11. The control loop feedback mechanism may output a control command $P_{cmd}$ based on a mapping function $f$. The input to f may be $\Delta l$ or $-\Delta l$. The output of f may be a state change corresponding to the input or a control command for achieving the state change. In an example, the mapping function is f (x)=x. Thus, $P_{cmd}=f(-\Delta l)=-\Delta l$. In another example, the mapping function is f (x)=-x. Thus, $P_{cmd}=f(\Delta l)=-\Delta l$. The control command can be executed by a propulsion system of the controllable object, causing the controllable object to move from position $r_1$ to $r_2$, such that the resulting baseline, $l_1$, between the controlling object and the controllable object is substantially the same as the original baseline $l_1$ before the baseline change. Accordingly, the controllable object can be controlled to follow the controlling object with high precision.

As shown in scenario 800*b*, the controlling object may remain at position $b_1$, while the controlling object moves from position $r_1$ to position $r_2$, causing the baseline to change from $l_1$ to $l_2$, with a baseline change of, $\Delta l = l_2 - l_1$. In some cases, the movement of the controlling object may be unintended. For example, the movement may be caused by an external factor (e.g., wind) or an internal factor (e.g., sensor error). To maintain the constant baseline vector between the objects, the baseline change, $\Delta l$, may be provided to a control loop feedback mechanism such as illustrated in FIGS. 10-11, and mapped to a corresponding control command based on the same function $f$ as under scenario 700*a*: $P_{cmd}=f(-\Delta l)=-\Delta l$. In another example, the mapping function is f (x)=-x. Thus, $P_{cmd}=f(\Delta l)=-\Delta l$. The control loop feedback mechanism may output a control command $P_{cmd}$ to a propulsion system of the controllable object, causing the controllable object to move from position $r_2$ back to position $r_1$. Accordingly, when the controlling object remains substantially still, the controllable object can be controlled to substantially maintain a position (e.g., in a hovering state) with high precision, while improving the controllable object's capability to resist external and/or internal interference.

FIG. 9 illustrates additional exemplary control methods based on baseline change, in accordance with embodiments. The illustrated mapping between the baseline change between the controlling object and the controllable object and the corresponding state change of the controllable object may be more complex than those discussed in FIG. 8.

As illustrated in scenario 900*a*, when the controlling object moves from position $b_1$ to position $b_2$, the baseline between the controlling object and the controllable object changes from $l_1$ to $l_2$, resulting in a baseline change, $\Delta l_b = l_2 - l_1$. The mapping function $f$ may be applied so as to cause a corresponding positional change, $\Delta l_r$, for the controllable object. For instance, the mapping function may be: f(x)=Ax, where A is a predetermined scalar. The mapping function may be used to generate the control command for the positional change: $P_{cmd}=f(-\Delta l)$ or $P_{cmd}=f(\Delta l)$, such that when the control command is executed by the controllable object, it is moved from position $r_1$ to $r_2$, resulting in a new baseline, $b_3$, between the controllable object and the controlling object.

In some examples, such as illustrated, the controlling object may move along a navigation path (e.g., a geometric shape or pattern, a number, an alphabet) with a set of characteristics or attributes (e.g., radius). The movement of the controlling object may be mapped to a corresponding movement of the controllable object via the predetermined mapping function such that controllable object moves with a corresponding set of characteristics (e.g., radius).

For instance, in the illustrated scenario 900a, the controlling object is moving along a circle around with a radius r from a center at point $O_b$. The positional change of the controlling object, $\Delta l_b$, is mapped via the mapping function $f(x)=Ax$, to a corresponding positional change $\Delta l_r$, where the $|\Delta l_r|=|A \Delta l_b|$. Thus, the controllable object may be controlled to move along a substantially similar path (e.g., a circle centered at $O_r$) with a different set of characteristics, such as a larger radius $R=|A|r$. The center $O_r$ may or may not be at or near the location of the controlling object.

In other examples a state change of the controllable object can include a change in an orientation, a movement direction, a velocity or speed (linear or angular), an acceleration (linear or angular), and the like. For example, a speed of the controllable object may increase or decrease by an amount or at a rate that is calculated based on the predetermined mapping function and the baseline change. In another example, a heading of the controllable object or a rotation angle of an image device may change by an angle or at a rate that is calculated based on the predetermined mapping function and the baseline change.

In some embodiments, such as illustrated in scenario 900b, the baseline change can be used to trigger, activate, deactivate, or otherwise control an operation of the controllable object. The operation control can be related to a functionality, a routine, a process, a component, or a payload of the controllable object. In an embodiment, the baseline change may be processed to determine a movement pattern of the controllable object. For instance, when the controllable object moves from position $b_1$ to position $b_2$, and then from position $b_2$ to position $b_3$, the baseline changes from $l_1$ to $b_2$ to $l_3$ can be analyzed by one or more processors onboard the controllable object and/or the controlling object to determine a "V" shape movement pattern. In some cases, the determination of the movement pattern can include comparing the baseline changes with attributes of pre-stored movement templates or patterns to determine if there is a match. The match may be determined based on any suitable pattern recognition, statistical analysis, and/or machine learning techniques. The matching movement pattern can then be used to determine or select a corresponding operation for the controllable object or a component thereof. For instance, a "V" shaped movement pattern may correspond to a command to capture one or more images (e.g., a still image or a video) by an imaging device carried by the controllable object (e.g., a shutter release command). As another example, when a user draws the letters "go home" using the controlling object, a predefined, autonomous go-home routine may be activated on the controllable object, causing controllable object to autonomously navigate to a predetermined location (e.g., a takeoff location).

Additional examples of such a state change of the controllable object can include a change in a navigation path or pattern, an operation mode, and/or a functionality of the controllable object. For example, the controllable object may be controlled to change from a first type of flight path (e.g., a straight path) to a second type of flight path (e.g., an "S" shaped or a circular path) based on the baseline change. Additional examples of functionalities that may be activated or deactivated can include automatic landing, automatic launch, hover, tracking of an object of interest (e.g., a person or a vehicle), obstacle avoidance, recording of audio signals, adjustment of a carrier of a payload, and the like. Exemplary components that can be controlled can include propulsion units, sensors, power units (batteries), flight controllers, communication units, and the like. The mapping function discussed herein can be considered to generally include any mapping between a baseline change and a corresponding state change of the controllable object, such as described herein.

In some embodiments, each of the control methods described above corresponds to a control mode and more than one control modes can be implemented by the controlling and/or controllable object. For example, the control modes may include a tracking/following control mode such as discussed in FIG. 8, a positional control mode such as discussed in 900a of FIG. 9, and a pattern-based control mode such as discussed in 900b of FIG. 9. A user may switch between the different control modes using an input device provided by the controlling object, or another suitable terminal. The input device may include a touchscreen, a joystick, a button, a microphone, a camera, and the like. In some cases, the controllable object and/or the controlling object may automatically switch from one mode to another based on a current state of the controllable object and/or the controlling object (e.g., position, orientation, altitude, velocity, acceleration) or a component thereof (e.g., battery status, propulsion system status). In some cases, the mode switch may be based on a condition of the surrounding environment (e.g., weather, obstacles, interference).

In some embodiments, some aspects of the baseline mapping described above may be configurable by a user or administrator. For instance, a user may be able to input, edit, or otherwise change a mapping function (including various parameters thereof) using an input device provided by the controlling object, or another suitable terminal. For example, the input device may enable the user to change the value of the scalar A discussed in connection with 900a of FIG. 9. In another example, the input device may allow a user to associate different mapping functions with different situations (e.g., different baseline changes, different UAV states, different environmental factors, etc.).

In some embodiments, the mapping functions may be pre-loaded into a memory of the controlling object and/or the controllable object before the controllable object is in operation (e.g., when it is landed). In some other embodiments, updates to the mapping functions may be applied dynamically in real time or nearly real time when the controllable object is in operation (e.g., when it is airborne).

According to embodiments, baseline measurements between a controlling object and a controllable object can be used by a feedback loop controller to control a state (e.g., a position) of the controllable object. FIG. 10 illustrates an exemplary process 1000 for controlling a state of a controllable object 1002, in accordance with embodiments. Aspects of the process 1000 can be implemented by one or more processors onboard the controllable object, the controlling object, or both.

In some embodiments, the process 1000 can be used control a position of the controllable object at centimeter level or sub-centimeter level accuracy. For instance, a desired position of the controllable object can be determined based on a baseline change and a mapping function using process 500 of FIG. 5. Subsequently, the baseline can be measured and the position of the controllable object can be adjusted at predetermined frequencies so as to maintain the desired position using the process 1000.

As illustrated in FIG. 10, an estimated state 1006 of the controllable object 1002 can be estimated based on the measured baseline 1004 between the controllable object 1002 and the controlling object (not shown). For example, an estimated positon of the controllable object 1002 may be determined based on the baseline and a previously estimated position. The baseline measurements can be obtained using the techniques described herein with centimeter level or sub-centimeter level accuracy. The baseline measurements 1004 can be obtained at predetermined frequencies.

The estimated state 1006 can be compared with a desired or reference state 1008 to determine a state difference or error 1010. In some embodiments, the desired state 1008 may be determined based on a mapping function such as described herein. The state difference 1010 can be used by a controller such as a PID controller to generate control signals for adjusting the state of the controllable object 1002, so as to reduce the state difference 1010. Updated baseline measurements can be obtained after the adjustment, using the output state 1012 of the controllable object 1002. The updated baseline measurement can then be used to generate further controls for the controllable object as described above. Such a feedback control loop process 1000 can run for many iterations. In some embodiments, aspects of the process 1000 may be implemented by processors onboard the controllable object 1002. Alternatively, the aspects of the process 1000 may be implemented by processors onboard a remote device (e.g., the controlling object, a base station).

FIG. 11 illustrates an exemplary control scheme 1100 for controlling a controllable object such as UAV, in accordance with embodiments. As shown in FIG. 11, a UAV 1101 can employ a control scheme 1100 that includes a position control component 1103, a velocity control component 1104, a tilt control component 1105, and an orientation control component 1106. Some of the above components may be optional in some embodiments.

In accordance with various embodiments, a sensing system on the UAV 1101 can measure the state of the UAV 1101. Additionally, the system can obtain the estimated flight status based on various data fusion techniques 1102. The sensing system can obtain the measured UAV position, velocity, orientation, tilt, and/or angular velocity. For example, a GPS sensor can obtain the estimated position of the UAV 1101, an IMU, which may include a gyroscope, accelerometer, and magnetometer can obtain the estimated acceleration and angular velocity of the UAV 1101, as well as the estimated orientation of the UAV 1101.

In accordance with various embodiments, the control scheme 1100 can be adjusted for controlling the UAV 1101 in different circumstances. For example, in order to maintain the UAV 1101 hovering at a fixed position or traveling along a desired path, the position control component 1103 can generate a desired velocity 1122 to counter any drift movement of the UAV 1101 away from its desired position 1121. Furthermore, the velocity control component 1104 can generate desired tilt 1123 for achieving the desired velocity 1122. Then, the tilt control component 1105 can generate motor control signals for achieving the desired tilt 1123 based on the estimated tilt 1114 and estimated angular velocity 1115. Such motor control signals can be used for controlling the various movement mechanics 1131-1133 associated with the UAV 1101.

As shown in FIG. 11, a position control component 1103 can obtain a desired velocity 1122 based on the difference of the desired position 1121 and the estimated position 1111. In some embodiments, the position control components 1103 may be configured to receive the difference between the desired position and the estimated position (e.g., from a remote controller). Also, a velocity control component 1104 can obtain the desired tilt 1123 based on the difference between the desired velocity 1122 and the estimated velocity 1112. Additionally, a title control component 1105 can calculate the motor control signals based on the estimated angular velocity 1115 and the difference between the desired tilt 1123 and the estimated tilt 1114.

Also, the UAV 1101 can maintain a fixed orientation or a desired orientation, the orientation control component can generate motor control signals for generating a force that can counter any drift of the UAV orientation. Also as shown in FIG. 11, an orientation control component 1106 can generate the motor control signals based on the difference between the desired orientation 1124 and the estimated orientation 1113. Thus, the combined or integrated motor control signals can be used for controlling the various movement mechanics 1131-1133 associated with the UAV 1101, the movement characteristics of which can be measured and can be used for generating further control signals for controlling the UAV 1101 in real-time.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$3, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

The UAV can include a propulsion system having four rotors. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 12:
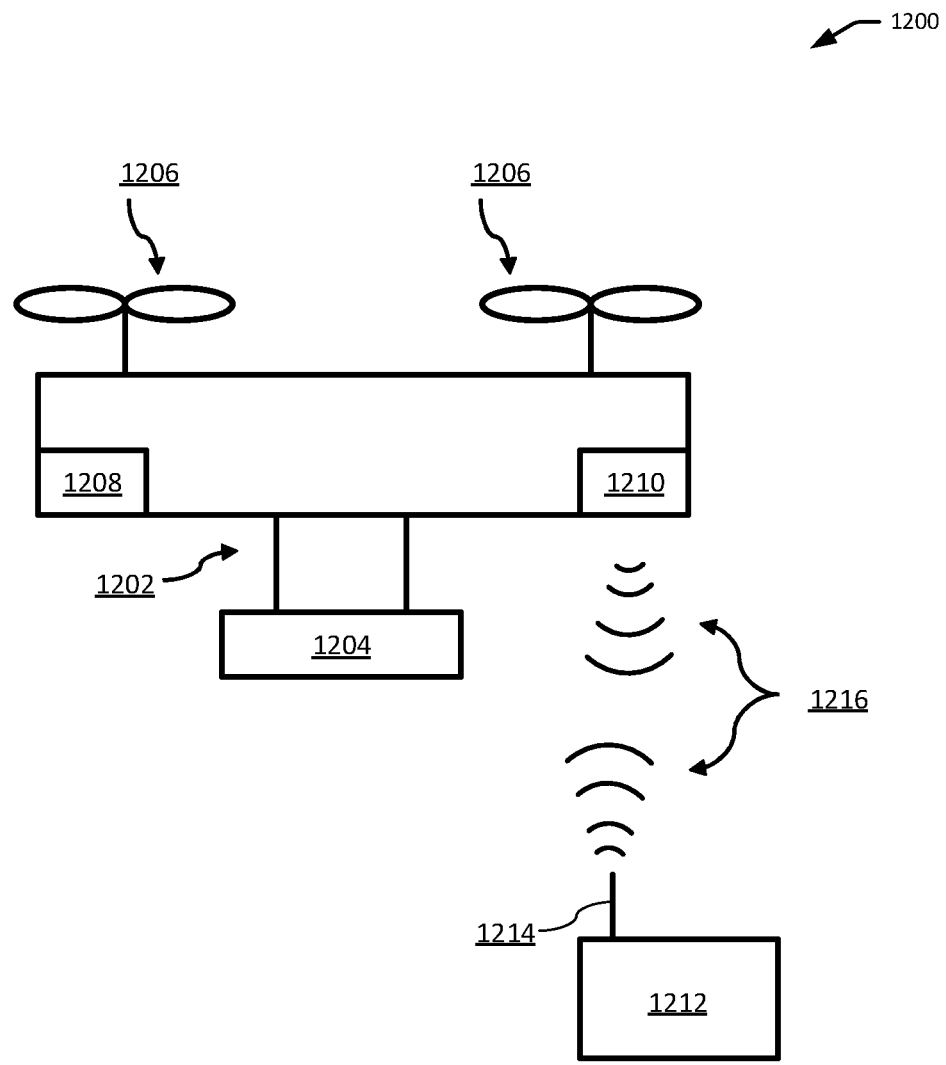
FIG. 12 illustrates a movable object including a carrier and a payload, in accordance with embodiments.

FIG. 12 illustrates a movable object 1200 including a carrier 1202 and a payload 1204, in accordance with embodiments. Although the movable object 1200 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1204 may be provided on the movable object 1200 without requiring the carrier 1202. The movable object 1200 may include propulsion mechanisms 1206, a sensing system 1208, and a communication system 1210.

The propulsion mechanisms 1206 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1206 can be mounted on the movable object 1200 using any suitable means, such as a support element (e.g., a drive shaft) as described elsewhere herein. The propulsion mechanisms 1206 can be mounted on any suitable portion of the movable object 1200, such on the top, bottom, front, back, sides, or suitable combinations thereof.

In some embodiments, the propulsion mechanisms 1206 can enable the movable object 1200 to take off vertically from a surface or land vertically on a surface without requiring any horizontal movement of the movable object 1200 (e.g., without traveling down a runway). Optionally, the propulsion mechanisms 1206 can be operable to permit the movable object 1200 to hover in the air at a specified position and/or orientation. One or more of the propulsion mechanisms 1200 may be controlled independently of the other propulsion mechanisms. Alternatively, the propulsion mechanisms 1200 can be configured to be controlled simultaneously. For example, the movable object 1200 can have multiple horizontally oriented rotors that can provide lift and/or thrust to the movable object. The multiple horizontally oriented rotors can be actuated to provide vertical takeoff, vertical landing, and hovering capabilities to the movable object 1200. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1200 (e.g., with respect to up to three degrees of translation and up to three degrees of rotation).

The sensing system 1208 can include one or more sensors that may sense the spatial disposition, velocity, and/or acceleration of the movable object 1200 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1208 can be used to control the spatial disposition, velocity, and/or orientation of the movable object 1200 (e.g., using a suitable processing unit and/or control module, as described below). Alternatively, the sensing system 1208 can be used to provide data regarding the environment surrounding the movable object, such as weather conditions, proximity to potential obstacles, location of geographical features, location of manmade structures, and the like.

The communication system 1210 enables communication with terminal 1212 having a communication system 1214 via wireless signals 1216. The communication systems 1210, 1214 may include any number of transmitters, receivers, and/or transceivers suitable for wireless communication. The communication may be one-way communication; such that data can be transmitted in only one direction. For example, one-way communication may involve only the movable object 1200 transmitting data to the terminal 1212, or vice-versa. The data may be transmitted from one or more transmitters of the communication system 1210 to one or more receivers of the communication system 1212, or vice-versa. Alternatively, the communication may be two-way communication, such that data can be transmitted in both directions between the movable object 1200 and the terminal 1212. The two-way communication can involve transmitting data from one or more transmitters of the communication system 1210 to one or more receivers of the communication system 1214, and vice-versa.

In some embodiments, the terminal 1212 can provide control data to one or more of the movable object 1200, carrier 1202, and payload 1204 and receive information from one or more of the movable object 1200, carrier 1202, and payload 1204 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1206), or a movement of the payload with respect to the movable object (e.g., via control of the carrier 1202). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1208 or of the payload 1204). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1212 can be configured to control a state of one or more of the movable object 1200, carrier 1202, or payload 1204. Alternatively or in combination, the carrier 1202 and payload 1204 can also each include a communication module configured to communicate with terminal 1212, such that the terminal can communicate with and control each of the movable object 1200, carrier 1202, and payload 1204 independently.

In some embodiments, the movable object 1200 can be configured to communicate with another remote device in addition to the terminal 1212, or instead of the terminal 1212. The terminal 1212 may also be configured to communicate with another remote device as well as the movable object 1200. For example, the movable object 1200 and/or terminal 1212 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1200, receive data from the movable object 1200, transmit data to the terminal 1212, and/or receive data from the terminal 1212. Optionally, the remote device can be connected to the Internet or other telecommunications network, such that data received from the movable object 1200 and/or terminal 1212 can be uploaded to a website or server.

Figure 13:
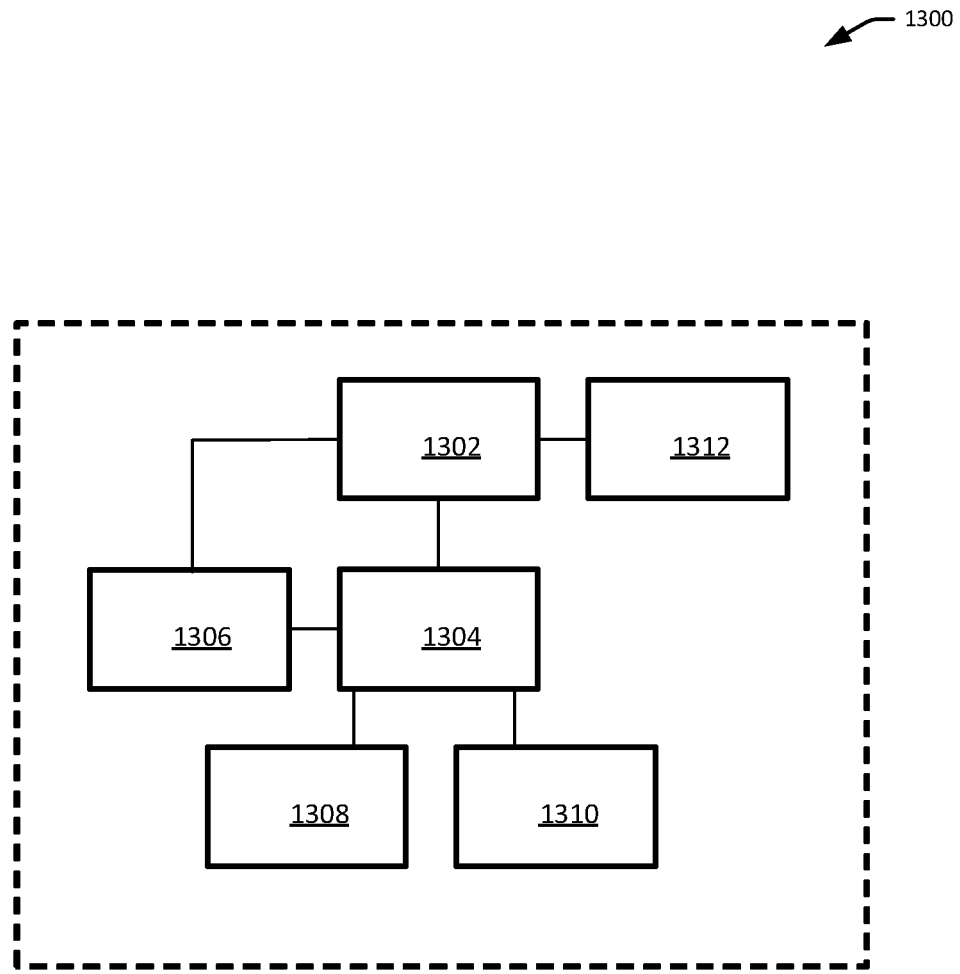
FIG. 13 is a schematic illustration by way of block diagram of a system for controlling a movable object, in accordance with embodiments.

FIG. 13 is a schematic illustration by way of block diagram of a system 1300 for controlling a movable object, in accordance with embodiments. The system 1300 can be used in combination with any suitable embodiment of the systems, devices, and methods disclosed herein. The system 1300 can include a sensing module 1302, processing unit 1304, non-transitory computer readable medium 1306, control module 1308, and communication module 1310.

The sensing module 1302 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1302 can be operatively coupled to a processing unit 1304 having a plurality of processors. In some embodiments, the sensing module can be operatively coupled to a transmission module 1312 (e.g., a Wi-Fi image transmission module) configured to directly transmit sensing data to a suitable external device or system. For example, the transmission module 1312 can be used to transmit images captured by a camera of the sensing module 1302 to a remote terminal.

The processing unit 1304 can have one or more processors, such as a programmable or non-programmable processor (e.g., a central processing unit (CPU), a microprocessor, an FPGA, an application—specific integrated circuit (ASIC)). The processing unit 1304 can be operatively coupled to a non-transitory computer readable medium 1306. The non-transitory computer readable medium 1306 can store logic, code, and/or program instructions executable by the processing unit 1304 for performing one or more steps. The non-transitory computer readable medium can include one or more memory units (e.g., removable media or external storage such as an SD card or random access memory (RAM)). In some embodiments, data from the sensing module 1302 can be directly conveyed to and stored within the memory units of the non-transitory computer readable medium 1306. The memory units of the non-transitory computer readable medium 1306 can store logic, code and/or program instructions executable by the processing unit 1304 to perform any suitable embodiment of the methods described herein. The memory units can store sensing data from the sensing module to be processed by the processing unit 1304. In some embodiments, the memory units of the non-transitory computer readable medium 1306 can be used to store the processing results produced by the processing unit 1304.

In some embodiments, the processing unit 1304 can be operatively coupled to a control module 1308 configured to control a state of the movable object. For example, the control module 1308 can be configured to control the propulsion mechanisms of the movable object to adjust the spatial disposition, velocity, and/or acceleration of the movable object with respect to six degrees of freedom. Alternatively or in combination, the control module 1308 can control one or more of a state of a carrier, payload, or sensing module.

The processing unit 1304 can be operatively coupled to a communication module 1310 configured to transmit and/or receive data from one or more external devices (e.g., a terminal, display device, or other remote controller). Any suitable means of communication can be used, such as wired communication or wireless communication. For example, the communication module 1310 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1310 can transmit and/or receive one or more of sensing data from the sensing module 1302, processing results produced by the processing unit 1304, predetermined control data, user commands from a terminal or remote controller, and the like.

The components of the system 1300 can be arranged in any suitable configuration. For example, one or more of the components of the system 1300 can be located on the movable object, carrier, payload, terminal, sensing system, or an additional external device in communication with one or more of the above. Additionally, although FIG. 13 depicts a single processing unit 1304 and a single non-transitory computer readable medium 1306, one of skill in the art would appreciate that this is not intended to be limiting, and that the system 1300 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1300 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A computer-implemented method for controlling a controllable object, comprising:
    determining a change in a baseline vector between a controlling object and the controllable object based on measurements from a first location sensor of the controlling object and a second location sensor of the controllable object;
    determining a control mode, the control mode being a tracking/following control mode, a positional control mode, or a pattern-based control mode;
    determining a mapping function based on the control mode;
    mapping the change in the baseline vector to a corresponding change in a navigation path of the controllable object based at least in part on the mapping function;
    generating one or more control commands according to the mapping; and
    controlling the controllable object to effect the change in the navigation path according to the one or more control commands.

2. The method of claim 1, wherein determining the change in the baseline vector comprises performing double-differencing on the measurements from the first location sensor and the second location sensor to obtain double-differenced measurements.

3. The method of claim 1, wherein the change in the navigation path comprises a change from a first type of navigation path to a second type of navigation path.

4. The method of claim 1, wherein the change in the navigation path comprises changing an attribute of a predetermined pattern.

5. The method of claim 4, wherein the attribute comprises a radius.

6. The method of claim 1, wherein the mapping function is dynamically selected from a plurality of mapping functions.

7. The method of claim 6, wherein the selection of the mapping function is based at least in part on characteristics of the controlling object or the controllable object, or a surrounding environment.

8. The method of claim 1, further comprising mapping the change in the baseline vector to an activation or a deactivation of a predefined routine of the controllable object.

9. The method of claim 1, further comprising mapping the change in the baseline vector to an operation of a component or a payload of the controllable object.

10. The method of claim 9, wherein the operation comprises obtaining sensing data by the component or the payload.

11. A remote control terminal, comprising:
    a satnav receiver configured to receive satellite signals from one or more satellites;
    a memory that stores one or more computer-executable instructions; and
    one or more processors configured to access the memory and execute the computer-executable instructions to perform a method comprising:
        determining a change in a baseline vector between the remote control terminal and the controllable object based on measurements from a first location sensor of the remote control terminal and a second location sensor of the controllable object;
        determining a control mode, the control mode being a tracking/following control mode, a positional control mode, or a pattern-based control mode;
        determining a mapping function based on the control mode;
        mapping the change in the baseline vector to a corresponding change in a navigation path of the controllable object based at least in part on the mapping function;
        generating one or more control commands according to the mapping; and
        controlling the controllable object to effect the change in the navigation path according to the one or more control commands.

12. The remote control terminal of claim 11, wherein the controllable object is an unmanned aerial vehicle (UAV).

13. The remote control terminal of claim 11, wherein determining the change in the baseline vector comprises performing double-differencing on the measurements from the first location sensor and the second location sensor to obtain double-differenced measurements.

14. The remote control terminal of claim 11, wherein the change in the navigation path comprises a change from a first type of navigation path to a second type of navigation path.

15. The remote control terminal of claim 11, wherein the change in the navigation path comprises changing an attribute of a predetermined pattern.

16. The remote control terminal of claim 15, wherein the attribute comprises a radius.

17. The remote control terminal of claim 11, wherein the mapping function is dynamically selected from a plurality of mapping functions based at least in part on characteristics of the remote control terminal or the controllable object, or a surrounding environment.

18. The remote control terminal of claim 11, wherein the method further comprises mapping the change in the baseline vector to an activation or a deactivation of a predefined routine of the controllable object.

19. The remote control terminal of claim 11, wherein the method further comprises mapping the change in the baseline vector to an operation of a component or a payload of the controllable object.

20. One or more non-transitory computer-readable storage media storing computer-executable instructions that, when executed by a computing system, configure the computing system to perform operations comprising:

determining a change in a baseline vector between a controlling object and the controllable object based on measurements from a first location sensor of the controlling object and a second location sensor of the controllable object;

determining a control mode, the control mode being a tracking/following control mode, a positional control mode, or a pattern-based control mode;

determining a mapping function based on the control mode;

mapping the change in the baseline vector to a corresponding change in a navigation path of the controllable object based at least in part on the mapping function;

generating one or more control commands according to the mapping; and controlling the controllable object to effect the change in the navigation path according to the one or more control commands.

* * * * *